US007887781B2

(12) United States Patent
Torgersen et al.

(10) Patent No.: US 7,887,781 B2
(45) Date of Patent: Feb. 15, 2011

(54) METHODS OF STORING HYDROGEN IN HYDROGEN STORAGE SYSTEMS

(75) Inventors: Alexandra N. Torgersen, Novi, MI (US); Scott W. Jorgensen, Bloomfield Township, MI (US); Stacey E. Siporin, Baton Rouge, LA (US)

(73) Assignee: GM Global Technology Operations LLC, Detroit, MI (US)

( * ) Notice: Subject to any disclaimer, the term of this patent is extended or adjusted under 35 U.S.C. 154(b) by 1536 days.

(21) Appl. No.: 11/226,065

(22) Filed: Sep. 14, 2005

(65) Prior Publication Data

US 2006/0088467 A1  Apr. 27, 2006

Related U.S. Application Data

(60) Provisional application No. 60/612,585, filed on Sep. 23, 2004.

(51) Int. Cl.
*C01B 3/00* (2006.01)
(52) U.S. Cl. .................. 423/658.2; 423/644; 423/648.1
(58) Field of Classification Search ................ 423/644, 423/648.1, 658.2
See application file for complete search history.

(56) References Cited

U.S. PATENT DOCUMENTS

| | | | | |
|---|---|---|---|---|
| 3,821,044 | A | 6/1974 | Roberts | ............... 149/109 |
| 7,279,222 | B2 * | 10/2007 | Hearley et al. | .............. 428/403 |
| 2003/0026757 | A1 * | 2/2003 | Pecharsky et al. | ........ 423/658.2 |
| 2003/0129126 | A1 | 7/2003 | Chen et al. | ................. 423/645 |
| 2003/0180587 | A1 | 9/2003 | Jones et al. | |
| 2005/0106097 | A1 * | 5/2005 | Graham et al. | ........... 423/648.1 |
| 2005/0180916 | A1 * | 8/2005 | Autrey et al. | ............. 423/658.2 |
| 2005/0191235 | A1 * | 9/2005 | Vajo et al. | .................... 423/657 |

OTHER PUBLICATIONS

Baitalow, F. et al. "Thermal Decomposition of B-N-H Compounds Investigated by Using Combined Thermoanalytical Methods" Thermochimica Acta, vol. 391 (2002), pp. 159-168.
Hu, M.G. et al. "The Thermal Decomposition of Ammonia-Borane" Thermochimica Acta, vol. 23 (1978), pp. 249-255.
Morinaga, M. et al. "Roles of Constituent Elements and Design of Hydrogen Storage Alloys" Journal of Alloys and Compounds, vol. 330-332 (2002), pp. 20-24.
Ruff, John et al. "The Amine Complexes of Aluminum Hydride. I" J. Am. Chem. Soc., vol. 82 (May 5, 1960), pp. 2141-2144.

(Continued)

*Primary Examiner*—Stanley Silverman
*Assistant Examiner*—Paul A Wartalowicz
(74) *Attorney, Agent, or Firm*—Reising Ethington P.C.

(57) ABSTRACT

In one aspect, the invention provides a method of storing hydrogen that comprises reacting two precursors to form a hydrogen storage composition comprising hydrogen, nitrogen, a Group 13 element, and an element selected from Group 1, Group 2 or mixtures thereof. In other aspects, the present invention provides a method of storing hydrogen by ball-milling two precursors at a temperature in a range sufficient to prevent pre-mature release of hydrogen, while the temperature is still sufficient to induce reaction between the precursors. The precursors preferably have X—H, Y—H and A-H bonds where X represents a Group 13 element, Y represents a Group 15 element, and A represents an element from Group 1, Group 2, or mixtures thereof. Other variations of the methods of storing hydrogen are further provided.

11 Claims, 17 Drawing Sheets

OTHER PUBLICATIONS

Ruff, John et al. "The Amine Complexes of Aluminum Hydride. II" J. Am. Chem. Soc., vol. 83 (Feb. 5, 1961), pp. 535-538.

Wiberg, Von Egon et al. "Uber die Umsetzung von Aluminiumwasserstoff mit Ammoniak und Aminem", Z. Naturforsch, vol. 10B (1955), pp. 229-235.

Wolf, G. et al. "Calorimetric Process Monitoring of Thermal Decomposition of B-N-H Compounds" Thermochimica Acta, vol. 343 (2000), pp. 19-25.

Wolf, G. et al. "Thermochemical Investigations on Borazane ($BH_3$-$NH_3$) in the Temperature Range from 10 to 289 K" Thermochimica Acta, vol. 317 (1998), pp. 111-116.

Aldrich Chemical Company Order Catalogue, Borane-Ammonia Complex (1994), p. 195.

International Search Report for PCT/US05/32698 filed Sep. 14, 2005 and corresponding to this application.

* cited by examiner

METHODS OF STORING HYDROGEN IN HYDROGEN STORAGE SYSTEMS

CROSS-REFERENCE TO RELATED APPLICATIONS

This application claims the benefit of U.S. Provisional Application No. 60/612,585, filed on Sep. 23, 2004, which is herein incorporated by reference in its entirety.

FIELD OF THE INVENTION

The present invention relates to hydrogen storage compositions, the method of making such hydrogen storage compositions and use thereof for storing hydrogen.

BACKGROUND OF THE INVENTION

Hydrogen is desirable as a source of energy because it reacts cleanly with air producing water as a by-product. In order to enhance the desirability of hydrogen as a fuel source, particularly for mobile applications, it is desirable to increase the available energy content per unit volume and mass of storage. Presently, this is done by conventional means such as storage under high pressure, at thousands of pounds per square inch, cooling to a liquid state, or absorbing hydrogen into a solid such as a metal hydride. Pressurization and liquification require relatively expensive processing and storage equipment.

Storing hydrogen in a solid material provides relatively high volumetric hydrogen density and a compact storage medium. Hydrogen stored in a solid is desirable since it can be released or desorbed under appropriate temperature and pressure conditions, thereby providing a controllable source of hydrogen.

Presently, it is desirable to maximize the hydrogen storage capacity or content released from the material, while minimizing the weight of the material to improve the gravimetric capacity. Further, many current materials only absorb or desorb hydrogen at very high temperatures and pressures. Thus, it is desirable to find a hydrogen storage material that generates or releases hydrogen at relatively low temperatures and pressures, and which has a relatively high gravimetric hydrogen storage density.

Therefore, in response to the desire for an improved hydrogen storage medium, the present invention provides a method of storing and releasing hydrogen from storage materials, as well as an improved hydrogen storage material composition.

SUMMARY OF THE INVENTION

In one aspect, the present invention provides a method of storing hydrogen comprising reacting a precursor (a) with precursor (b). The reacting forms a hydrogen storage composition comprising hydrogen, nitrogen, a Group 13 element, and an element selected from Group 1, Group 2 or mixtures thereof. Precursors (a) and (b) together comprise X—H, B—H and A-H bonds where X represents said Group 13 element and A represents said element from Group 1, Group 2 or mixture thereof. In one variation, X is boron (B—H) and Y is nitrogen (N—H). In a still further preferred variation, the B—H, N—H composition forms the first precursor (a) and is borazane, also named borane-ammonia complex, $BH_3NH_3$. In another variation, precursor (b) is a hydride that is preferably selected from LiH, $LiAlH_4$ and mixtures thereof.

In another aspect, the present invention provides a method of storing hydrogen comprising ball-milling a precursor (a) and a precursor (b) at a temperature in a range sufficient to prevent pre-mature release of hydrogen and sufficient to induce reaction between precursors (a) and (b). The reaction provides a hydrogen-containing product different from (a) and (b), where precursors (a) and (b) together comprise X—H, Y—H and A-H bonds. X represents a Group 13 element, Y represents a Group 15 element, and A represents an element from Group 1, Group 2, or mixtures thereof.

Another aspect of the invention provides a method of storing hydrogen comprising ball-milling precursor (a) and precursor (b) at a temperature in a range sufficient to prevent pre-mature release of hydrogen and sufficient to induce reaction between precursors (a) and (b) to provide a hydrogen-containing product different from (a) and (b). Precursor (a) comprises borazane ($BH_3NH_3$). Precursor (b) is a hydride selected from the group consisting of: LiH, $LiAlH_4$ and mixtures thereof.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 1 shows XRD patterns for $nLiH—BH_3NH_3$ (n=⅓, ½, 1 and 2). The β phase diffraction peaks are labeled with circles and the γ phase diffraction peak is labeled with asterisk. The two broad peaks in the n=⅓ sample are labeled δ. FIG. 2 shows XRD patterns for $nLiH—BH_3NH_3$ (n=2, 3, 4, 5 and 6).

DETAILED DESCRIPTION OF THE PREFERRED EMBODIMENTS

Figure 1:
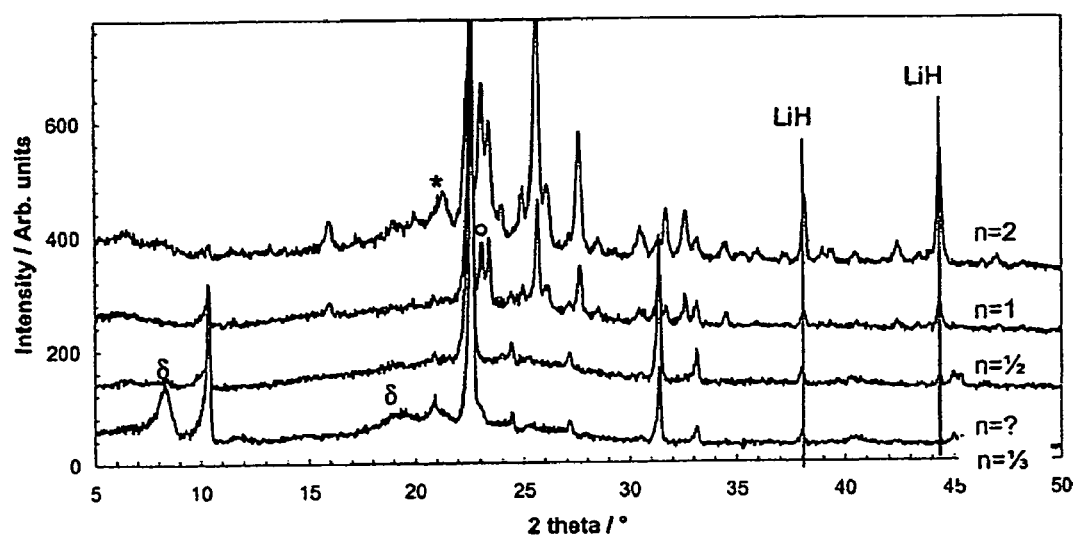
FIGS. 1 and 2 show X-ray diffraction (XRD) patterns of the intermediate (INT) product having α, β and γ phases produced by reaction in the $nLiH—BH_3NH_3$ system.

The following description of the preferred embodiment(s) is merely exemplary in nature and is in no way intended to limit the invention, its application, or uses.

In one aspect, the present invention provides a method of storing and releasing hydrogen. In one feature, a hydrogen storage material is formed by combining precursors (a) and (b), each of which are solids. The (a) precursor is preferably a compound containing X—H and Y—H bonds, where X is a Group 13 and Y is a Group 15 element of the IUPAC Periodic Table of Elements. Preferably X is boron (B—H) and Y is nitrogen (N—H). Most preferably, the precursor (a) is borazane. The (b) precursor is preferably a hydride. Most preferably, the hydride is LiH or LiAlH$_4$.

A novel hydrogen storage composition material is formed as an intermediate (INT) in the reaction of the (a) with the (b) precursors, as described above. The formation of such an INT compound is dependent upon the individual chemical characteristics of the precursors selected, and the temperature, milling and other conditions of preparation. The INT hydrogen storage material is preferably in a solid phase form, and in a preferred aspect is in a multi-phase form. The INT hydrogen storage composition preferably comprises hydrogen, nitrogen, and at least one of the one or more elements other than hydrogen and nitrogen derived from the precursors. The INT hydrogen storage composition further undergoes a decomposition reaction where the stored hydrogen is released. The products of this decomposition reaction are hydrogen and one or more byproducts.

In a preferred aspect, the present invention provides a method of storing hydrogen in a B—H—Li—N quarternary INT hydrogen storage composition. The reaction between the precursors (a) and (b), forms the quarternary intermediate. Subsequent to the formation of the INT, hydrogen may be stored at suitable conditions in a stable form. When the release of hydrogen is desired, heat and/or pressure are applied to facilitate a decomposition reaction, where hydrogen gas is released from the quarternary INT hydrogen storage composition, and one or more decomposition byproducts are formed as H$_2$ is released.

In another aspect, the present invention provides a method of releasing and generating hydrogen by reacting (a) composition having X—H and Y—H bonds with a (b) hydride. The (a) and (b) precursors react to release and form hydrogen and one or more byproducts. In such methods of the present invention, the (a) and (b) precursors react to directly produce hydrogen via reaction, rather than to form an intermediate (INT). Whether the INT forms is related to the thermodynamics of each reaction and the nature of the precursors.

Thus, in certain preferred embodiments, the present invention provides two distinct physical states, one where hydrogen is "stored" and another subsequent to hydrogen release. Where the starting reactants react without forming an INT, the hydrogenated storage state corresponds to the precursor reactants (i.e., because a stable hydrogenated intermediate is not formed), and the byproduct compound(s) correspond to the dehydrogenated state.

It should be understood that in the present invention the (a) precursor is preferably a compound based on Groups 13 and 15 elements and containing hydrogen; more preferably is a nitride; and most preferably is a borazane. The (b) precursor is preferably a hydride compound. Examples of such (a) and (b) precursors thus include, particularly for the hydride, metal cations, non-metal cations such as boron, and non-metal cations which are organic such as CH$_3$. Elements that form preferred precursors of the present invention are as follows. Preferred cationic species generally comprise: aluminum (Al), arsenic (As), boron (B), barium (Ba), beryllium (Be), calcium (Ca), cadmium (Cd), cerium (Ce), cesium (Cs), copper (Cu), europium (Eu), iron (Fe), gallium (Ga), gadolinium (Gd), germanium (Ge), hafnium (Hf), mercury (Hg), indium (In), potassium (K), lanthanum (La), lithium (Li), magnesium (Mg), manganese (Mn), sodium (Na), neodymium (Nd), nickel (Ni), lead (Pb), praseodymium (Pr), rubidium (Rb), antimony (Sb), scandium (Sc), selenium (Se), silicon (Si), samarium (Sm), tin (Sn), strontium (Sr), thorium (Th), titanium (Ti), thallium (Tl), tungsten (W), yttrium (Y), ytterbium (Yb), zinc (Zn), zirconium (Zr), and organic cations including (CH$_3$) methyl groups.

Metal hydride compounds, as used herein, include those compounds having one or more cations other than hydrogen, and may comprise complex metal hydrides, which include two or more distinct cations other than hydrogen, as previously described. Examples are metal and metal alloy hydrides, such as AB$_5$ (LaNi$_5$), AB$_2$ (ZrMn$_2$), AB (TiFe), and A$_2$B (Mg$_2$Ni). Particularly preferred cations for hydrides comprise cations selected from Groups 1, 2 and 13 of the IUPAC Periodic Table and particularly from the group: Al, B, Ca, Li, Na, and Mg. In certain preferred embodiments, it is preferred that the cations are different species, forming the complex metal hydride, such as LiAlH$_4$ or LiBH$_4$. In certain embodiments, the metal hydride compound may have one or more cations that are selected from a single cationic species, such as Mg$_2$ and Ca$_2$. Preferred metal hydrides according to the present invention comprise the following non-limiting examples, lithium hydride (LiH), lithium aluminum hydride (LiAlH$_4$), sodium borohydride (NaBH$_4$), lithium borohydride (LiBH$_4$), magnesium borohydride (Mg(BH$_4$)$_2$) and sodium aluminum hydride (NaAlH$_4$).

As used herein, the term "composition" refers broadly to a substance containing at least the preferred chemical compound complex or phases, but which may also comprise additional substances or compounds, including impurities. The term "material" also broadly refers to matter containing the preferred compound composition complex or phases.

According to one preferred embodiment of the present invention, the general reaction for releasing hydrogen proceeds according to the following exemplary mechanisms:

$$n\text{LiAlH}_4 + \text{BH}_3\text{NH}_3 \rightarrow \text{H}_2 + \text{byproduct};\qquad(1)$$

$$n\text{LiH} + \text{BH}_3\text{NH}_3 \rightarrow \text{H}_2 + \text{byproduct}.\qquad(2)$$

The general representation is: hydride+XH—YH compound react to form hydrogen and byproduct(s). The mixture of hydride with the exemplary borazane provides a better hydrogen storage material than borazane alone. Cold, energetic milling of the precursors provides a better result since the proportion of hydrogen contained in the byproduct is lessened. Thus, the proportion of hydrogen released as H$_2$ gas is increased.

As previously discussed, in certain preferred embodiments an intermediate hydrogen storage composition is formed, which is expressed by the following general reaction:

$$n\text{LiH} + \text{BH}_3\text{NH}_3 \rightarrow \text{hydrogen} + \text{intermediate(INT)}$$

where the INT is a new B—H—Li—N quarternary system having previously-unknown phases, α, β and γ. Here, a 2:1 LiH+BH$_3$NH$_3$ forms nominally, Li$_2$BNH$_8$, containing the α, β and γ phases and LiH.

Although not wishing to be limited to any particular theory, a novel solid quarternary intermediate compound is known to occur where the hydride has one or more M' cations selected as Li, and generally believed to occur where M' is selected from Groups 1 and 2 of the IUPAC Periodic Table and particularly the group consisting of: Li, Ca, Na, Mg, K, Be, and mixtures thereof, and where X—H, Y—H precursor is a nitrogen-hydrogen precursor comprising a Group 13 element from the IUPAC Periodic Table. The preferred precursor is borazane. Where the novel INT hydrogen storage composition is formed, such a composition undergoes a decomposition reaction mechanism, to form a dehydrogenated state where one or more decomposition byproducts are formed as hydrogen is released.

Other non-limiting examples of alternate preferred embodiments according to the present invention where hydrogen generation occurs, include the following exemplary precursors and systems. LiH is substituted with NaH, KH, MgH$_2$, and/or CaH$_2$. Examples are the NaH—BH$_3$NH$_3$ and MgH$_2$—BH$_3$NH$_3$ systems. LiAlH$_4$ is substituted with NaAlH$_4$, LiBH$_4$, NaBH$_4$, LiGaH$_4$ and/or NaGaH$_4$. Further, BH$_3$NH$_3$ is substituted with BH$_3$PH$_3$, AlH$_3$NH$_3$, and/or AlH$_3$PH$_3$.

Preferred conditions for reactions of the invention vary with respect to preferred temperature and pressure conditions for each independent reaction. However, it is preferred that the reaction is carried out as a solid state reaction, in a non-oxidizing atmosphere, essentially in the absence of oxygen, preferably in an inert atmosphere, such as under nitrogen or argon. Further, as will be discussed in more detail below, it is preferred that the solid precursors are reduced in particle size from their starting size and/or energetically milled.

After the novel INT hydrogen storage composition is formed, it is a hydrogenated and stable material. When release of the hydrogen is desired, the composition is heated and hydrogen release preferably occurs at a temperature of between about 80° C. and about 170° C. at ambient pressure.

EXAMPLE 1

The present example is of the nLiH—BH$_3$NH$_3$ system. Samples were produced with high-energy ball-milling combinations of LiH and BH$_3$NH$_3$. The system was studied using X-ray diffraction, thermal analysis and mass spectrometry. Three quarternary phases, designated α, β and γ, were discovered. Of these three phases, at least two, the α and β phases, exhibit hydrogen storage properties. The α phase releases about 10 wt % hydrogen below 150° C. This hydrogen release is slow, taking place over about 20-30° C. The β phase has not been obtained in pure samples, however, analysis suggests approximately 25-40% of the sample is the β phase. This phase mixture has a 3 wt % hydrogen release at about 80° C. In both decomposition reactions, ammonia was seen as a byproduct in small quantities. For the α phase, diborane and borazine were additional byproducts. Furthermore, the hydrogen release is exothermic for both reactions. Rehydrogenation is in process.

Both LiH and BH$_3$NH$_3$ were purchased from Aldrich, with nominal technical purities of 99% and 90+%, respectively. For borazane, the major impurities were residual solvents.

Ball-milling was carried out in a Spex 8000 mixer mill using two 1.27 cm diameter and four 0.635 cm diameter hardened steel balls of aggregate mass 21 g for a 2 g typical sample mass. The ball-milling vessels were O-ring sealed hardened steel jars under 1 atmosphere of Ar. The milling times were varied between 30 minutes and 12 hours to ensure complete reaction of the starting materials. In the n≧2 samples, ball-milling of at least two hours was required for complete reaction between the LiH and BH$_3$NH$_3$. However, for lower LiH concentrations ball-milling times of one hour were sufficient to obtain equilibrium.

X-ray diffraction (XRD) was performed using a Siemens D5000 diffractometer and Cu Kα radiation. Diffraction patterns were collected between 5 and 85° 2θ at 0.020° increments. Samples were loaded under argon, and protected using a thin XRD-transparent film. Data analysis was performed using the Bruker EVA software package. The real-time in-situ XRD experiments were carried out in closed XRD capillary tube with a Bruker AXS General Area Detector Diffractometer System (GADDS) using Cu Kα radiation. The capillary tubes were filled and sealed under argon. Diffraction patterns were collected every minute while heating the sample at 1° C./min and recording the pressure.

The combined thermogravimetric (TGA), differential scanning calorimetry (DSC) and mass spectrometry (MS) technique was used to analyze the gaseous component while monitoring the weight loss and heat flow of the sample. The instrument used for this combined study was a Netzsch STA 409 unit equipped with a quadrupole mass spectrometer Pfeiffer QMG422 via a two-stage pressure reduction system with an alumina skimmer. This equipment allows for the detection of unstable products immediately after their formation (within subseconds). The system was evacuated and flooded with high-purity argon. The measurements were performed under argon (30 mL/min) in the dynamic mode. Sample sizes ranged from 5 to 20 mg, and the heating rates used were 5° C./min and 1° C./min from 25 to 250° C. The slower heating rate was used for the n<2 composition samples to avoid excessive foaming during analysis. Both TGA/DSC and signals from the mass spectrometer in the SIM (selective ion monitoring) mode were recorded.

Results of Example 1

X-Ray Diffraction (XRD)

Figure 2:
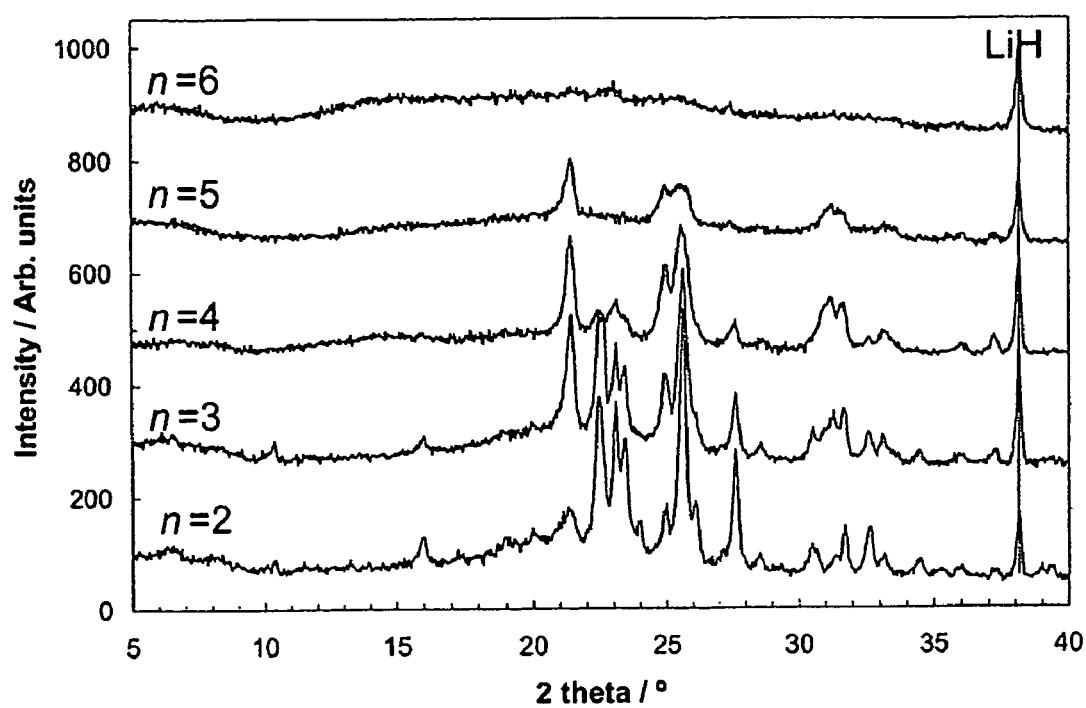

XRD patterns of the different compositions are shown in FIGS. 1 and 2. All the samples have been ball-milled until $BH_3NH_3$ was no longer detected. For LiH-poor samples (n=⅓, ½ and 1) one hour was sufficient, while the LiH-rich samples required two hours of ball-milling. For clarity, the LiH peak positions have been marked. In this system, the observed phases vary with LiH content. At small n-values, the predominant phase is assigned the α-phase, which is seen nearly as a pure phase in the n=½ sample. At this composition, only a very small amount of LiH is detected in addition to the α-phase. In the n=⅓ sample, some broader peaks are observed which are not consistent with the α-phase. These broad peaks have been labeled δ. LiH is not detected in the n=⅓ composition. With increasing LiH content, new phases appear in the diffractograms. The first new phase is seen for n=1, where at about 23-24° new peaks are seen. The new diffraction peaks are labeled with circles in FIG. 1. For n=2, a third phase is present, assigned γ-phase, giving a total of four phases, LiH, α, β and γ. The γ-peak at about 22° is labeled with asterisks in FIG. 1. There are many weaker reflections that appear with increasing LiH content, both for n=1 and n=2. The weaker reflections are considered resolvable to a respective previously-determined phase. The peak at about 26° appears first for n=1 as a strong middle peak in a triplet. Increasing the LiH to the n=2 composition causes the intensity of the 26° peak to increase further, while the two β peaks at 23° lose intensity (FIG. 1). Further increasing the LiH content, to n=5 (FIG. 2) results in a doublet in the 26° area, instead of the triplet that was there for n=1. This indicates that the β and γ phases have overlapping reflections in this region. Therefore, as a positive identification of the three phases α, β and γ, one single strong feature has been chosen; for α the strong peak at 22.6°, for β the doublet at 23° and for γ the peak at 21.4°.

One feature that should be noted is that the increasing LiH content in the samples causes the α and β phases to become amorphous. FIG. 2 shows that for the n=4 composition only very broad features are left of the α peak at 22.6° and the β doublet at 23°. The γ peak at 21.4°, however, is still strong and relatively sharp. At n=5, only the γ signature peak is left, together with two more broad features and the LiH peak, and at n=6, only the LiH peak is still present. It should be noted that even though the α, β and γ peaks show significant broadening of the XRD peaks upon increased LiH content, the LiH peak itself does not appear to change significantly.

Figure 3:
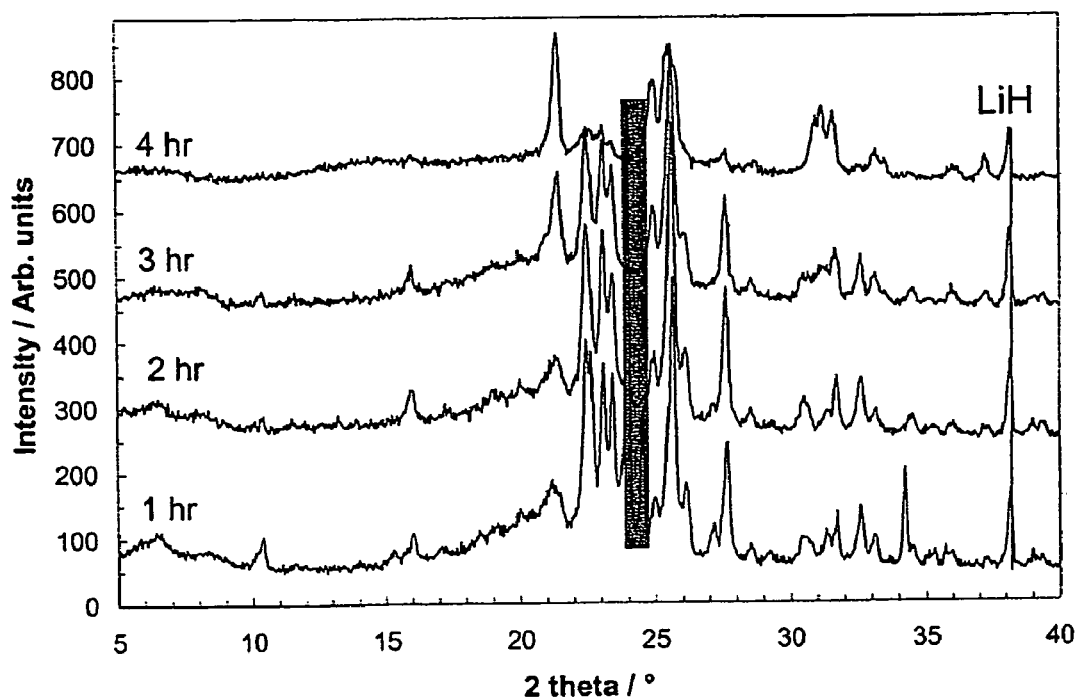
FIG. 3 shows XRD patterns for $nLiH—BH_3NH_3$ where n=2 as a function of ball-milling times of one, two, three, and four hours. The shaded area indicates the borazane peaks from the unreacted starting material are still present in the one-hour ball-milled sample.

FIG. 3 shows the XRD patterns as a function of ball-milling time for the n=2 composition. There is a loss of crystallinity with increasing ball-milling time. The only phase that appears unchanged by the ball-milling is LiH. When the ball-milling exceeds two hours, the diffraction peaks for the α and β phases broaden and lose intensity. After four hours, little is left of the α and β peaks leaving just the γ phase and LiH. However, the γ phase is also substantially broadened by the prolonged ball-milling. The loss in crystallinity with increased ball-milling time is typical for samples with larger LiH content (this it true also for the n=½ and n=1 compositions). First, the α and β phases become amorphous, then the γ phase becomes amorphous at a later stage while LiH remains unchanged.

Figure 4:
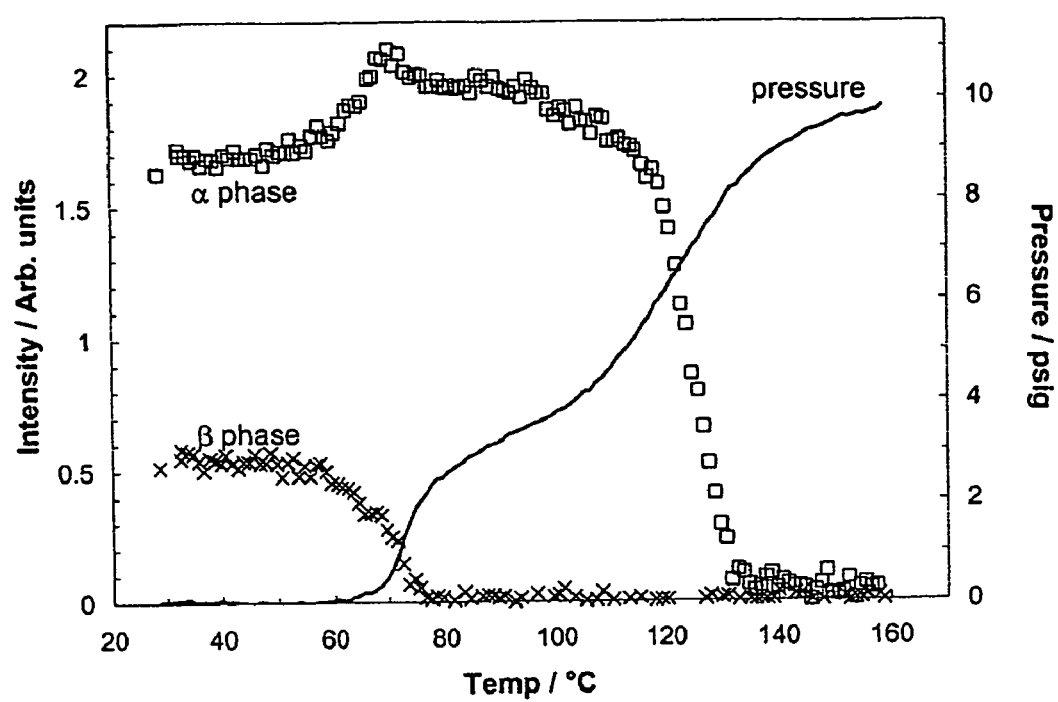
FIG. 4 shows XRD peak intensity of the strongest α and β peaks as a function of temperature for the $nLiH—BH_3NH_3$ where n=1 sample. The peak intensity data is taken by integrating the area under the peak, and for the β phase the chosen peak is the doublet at about 23°, while the α peak is at about 22.6°.

In order to assess the high temperature stability of the different phases in this system, in-situ XRD experiments were performed on the n=½, 1 and 2 samples. These three compositions represent all the phases observed in the quasi-binary LiH—$BH_3NH_3$ system. FIG. 4 shows the peak intensity of the strongest α and β peaks as a function of temperature for the n=1 sample. The pressure in the capillary tube is also plotted. The β phase (crosses) clearly decomposes much earlier than the α phase (squares). The β peaks have completely disappeared at 80° C., while the α peaks are present in the sample until 130° C. The pressure curve indicates a two-step pressure increase suggesting that both phases decompose by releasing a gas. The γ phase was not present in the in situ XRD data shown in FIG. 4, so a three-hour ball-milled n=2 sample was also studied. The γ peak intensities disappear at the same time as those of the β phase. Based on this, and the fact that some of the peaks overlap, it is difficult to separate the β and γ phase decompositions, and determine each phase contribution to hydrogen storage at low temperatures.

Because the α-phase was obtained as a nearly pure phase, a crystal structure could be determined. Table 1 displays the spacings, intensities and assigned indices. The indices relate to a tetragonal cell with a=4.032 angstroms and c=17.001 angstroms. From the systematic absences, the α-phase can be assigned the space group P-42₁c. The lattice parameters give a cell volume of 276.41 cubic angstroms, nearly twice the cell volume (139.72 cubic angstroms and 134.65 cubic angstroms) for the two crystal structures of $BH_3NH_3$ reported in the JCPDF. Therefore, it would be expected that the α-phase would have four $BH_3NH_3$ molecules per unit cell, twice that of neat $BH_3NH_3$, and two Li atoms per unit cell. Assuming no hydrogen is lost during the formation, the calculated density of the α-phase would be 0.837 g/cm³. Though the cell volume of the α-phase is twice that of $BH_3NH_3$, neither of the tetragonal lattice parameters have a rational relationship to those reported for $BH_3NH_3$. Therefore, XRD data indicates that the $BH_3NH_3$ molecules have a significantly different arrangement in the α-phase than $BH_3NH_3$, yet the cell volumes of the different structures is determined only by the number of $BH_3NH_3$ molecules.

Thermal Analysis

Figure 5:
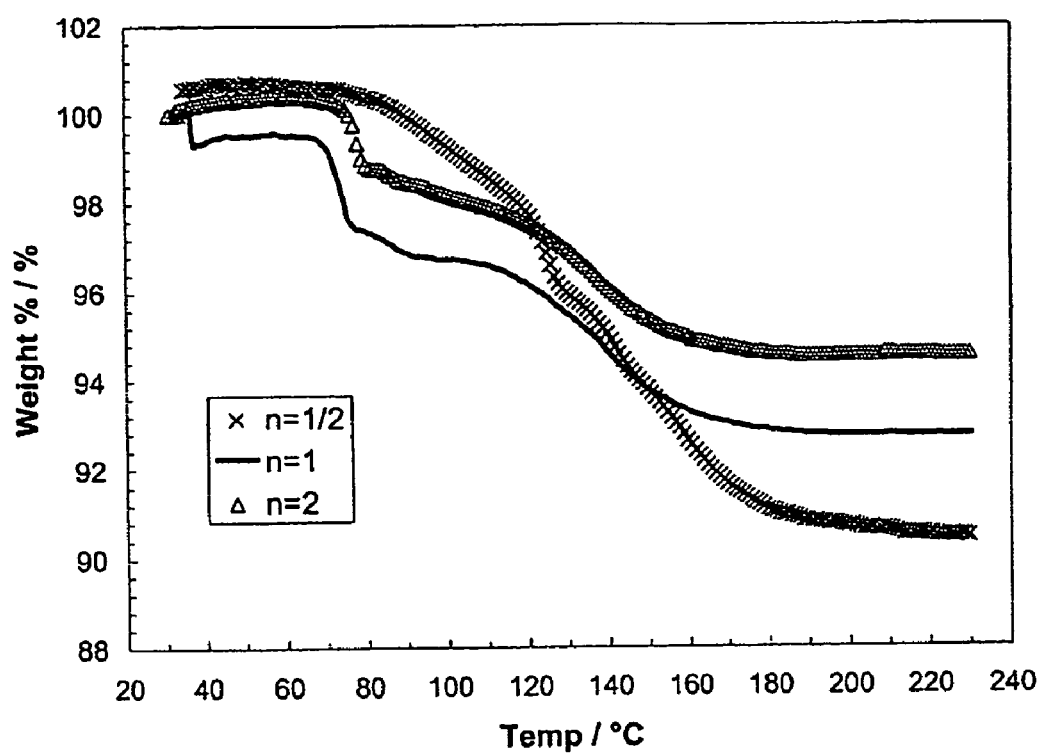
FIG. 5 shows thermogravimetric (TGA) curves for the system. TGA scans for $nLiH—BH_3NH_3$ (n=½, 1 and 2).

TGA curves for nLiH—$BH_3NH_3$ (n=½, 1 and 2) samples are shown in FIG. 5. The n=½ and 1 samples have been ball-milled for one hour and the n=2 sample for two hours, yielding samples with no residual $BH_3NH_3$. These three samples have been chosen since they are representative of the phases observed in the LiH—$BH_3NH_3$ system. The n=1 and 2 samples exhibit a two-step weight-loss process. The first step is initiated at about 70-80° C., and is fairly rapid. This is also the most pronounced step. The second step is quite slow, and starts around 120° C. and typically continues for 20-40° C. Above 180° C., the decomposition reaction has completed. For the n=½ sample, the weight loss appears to be a single-step process. The single step corresponds to the second, slower step seen in n=1 and 2. However, there is a small, gradual weight loss starting all ready at about 80° C. indicating some small amount of decomposition is taking place at low temperatures. The n=⅓ composition behaves practically identical to the n=½ composition. For higher LiH content (n=3, 4, 5 and 6), no new features are seen and the only change is in the total weight loss of the sample. The total weight loss becomes smaller, since the excess LiH in the sample acts as a filler at these temperatures.

It can be seen from FIG. 5 that the weight loss decreases as the LiH content increases. The n=½ sample has the largest overall weight loss, at about 10 wt %. Increasing the LiH content to n=1 gives a weight loss of about 7 wt. %, and n=2 has an even smaller weight loss, at about 5 wt. %. The maximum theoretical weight loss for the samples can be estimated assuming complete loss of hydrogen. If all hydrogen is released, the theoretical weight loss would be about 18 wt % for the n=1 sample, as illustrated in Equation 1. The complete dehydrogenation of this composition:

$$BH_3NH_3 + LiH \rightarrow LiBN + 3.5H_2; 18 wt.\% H_2 \quad \text{Equation 1}$$

However, XRD patterns show that some LiH remains in the samples after ball-milling, and LiH releases its hydrogen above 550° C. Due to the high temperature of the decomposition of LiH, the n>1 samples would have smaller, rather than larger, theoretical weight losses, since the excess LiH does not contribute to the hydrogen storage at the current temperature range up to 200° C.

The thermal behavior as a function of ball-milling time has also been studied for all sample compositions. Longer ball-milling times result in a smaller weight loss for most compositions. When samples are ball-milled for two hours or longer, there is a substantial pressure build up inside the ball-milling vessel. This excess pressure is due to the partial decomposition of the material during ball-milling. Therefore, a smaller weight loss seen in the TGA could mean that part of the material was already decomposed during ball-milling. When the sample is ball-milled overnight (12 hours), no weight loss was observed at all. This sample has a completely amorphous XRD pattern.

Figure 6:
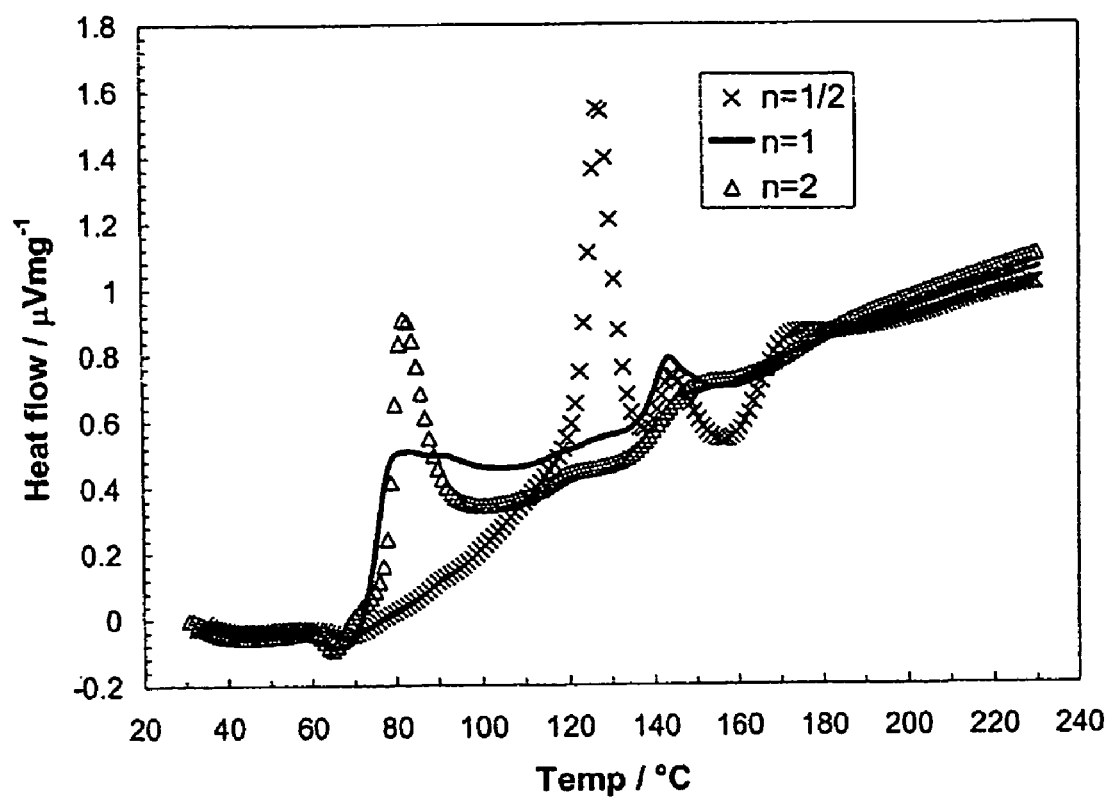
FIG. 6 shows differential scanning calorimetry (DSC) curves as a function of temperature in the system for $nLiH—BH_3NH_3$ (n=½, 1 and 2).

Differential scanning calorimetry has been used to study the heat flow during the decomposition reaction. FIG. 6 shows the DSC curves as a function of the temperature for the n=½, 1 and 2 compositions. The n=½ composition shows a sharp well-defined exothermic signal that corresponds to the weight loss at about 120° C. This exothermic peak is followed by a second small exothermic feature at about 140°. A small possible endothermic feature is present at about 160° C., and is directly followed by a third small exothermic peak. These last three events are rather small compared with the first feature, and when compared to FIG. 5, they do not seem to correspond to a weight loss. The endothermic peak could be a partial melting of the sample. A complete melting has not occurred as seen by the still powdery nature of the sample after the experiment is complete. Due to the upward sloping background in the DSC curves caused by the weight loss in the sample, the amount of overlap between the small exothermic and endothermic features is difficult to determine.

The n=1 composition has a rather broad exothermic signature in the temperature range of the first weight-loss step at about 70-80° C. A second exothermic feature is seen for the second weight loss at about 140° C. This second feature is much smaller than the first, but sharper. There are no apparent extra endo- or exothermic peaks present for this composition. In the case of the n=2, and more LiH rich samples, they all display a small endothermic peak before the first weight loss occurs, an endothermic peak that becomes overshadowed by the exothermic nature of the weight-loss reaction. This endothermic event might be a melting reaction that starts before the decomposition and is prevented from being completed by the decomposition reaction. The first step of the weight loss is associated with a single strong exothermic peak. The second weight loss corresponds with two very weak and broad exothermic signals. Based on the DSC data for all the different sample compositions, it is seen that all three phases, α, β and γ, decompose exothermically.

Figure 7:
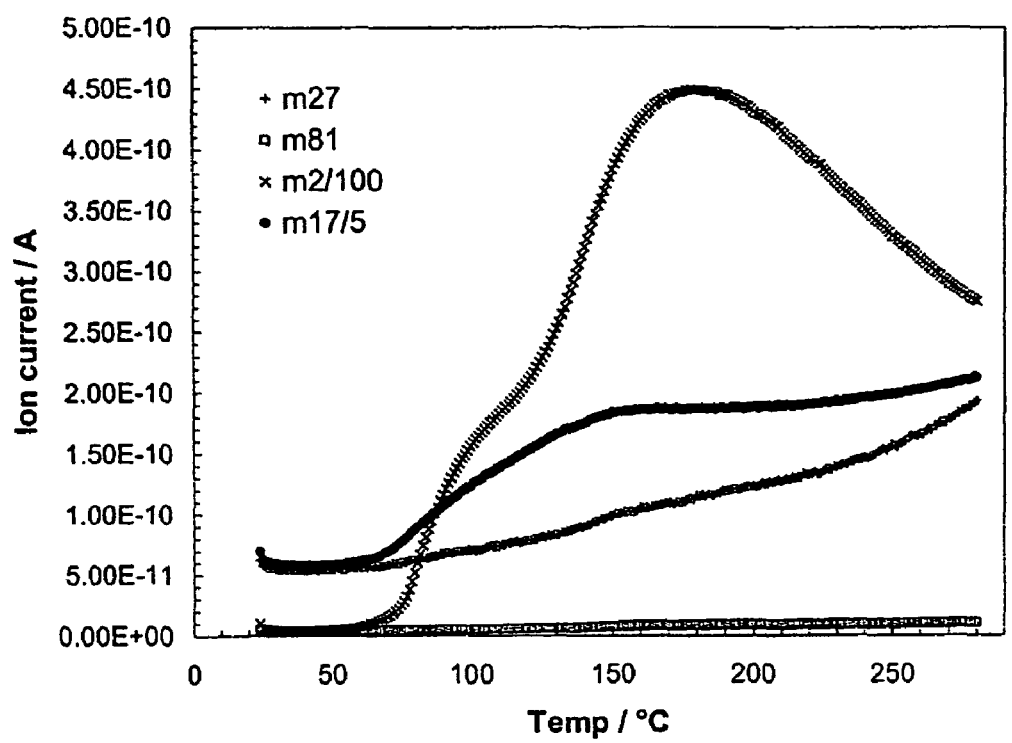
FIG. 7 shows the relationship between evolved gas and temperature for $nLiH—BH_3NH_3$ where n=½. Temperature dependence of the ion intensity is assigned to hydrogen (x), ammonia (●), diborane (□) and borazine (+) (heating rate 5° C./min) for $½LiH—BH_3NH_3$.

In order to determine which gases evolve during the decomposition of the samples, mass spectrometry was used. The MS data was collected simultaneously with TGA and DSC data, to be able to fully correlate the evolved gases with each step in the decomposition process. For the n=½ composition, a single-step weight loss is seen. Hydrogen is being released during this weight-loss step (FIG. 7). A small dip in the hydrogen signal is seen at about 140° C. A maximum in the hydrogen ion current signal is close to about 200° C. Hydrogen is a very light gas, and it takes time for it to move from the sample into the mass spectrometer chamber, and also to move back out. Therefore, the signal does not return to the baseline even after $H_2$ is no longer being released. $NH_3$ is also present in the gas phase. This $NH_3$ is released at about the same temperature as the $H_2$, thereby making it difficult to avoid ammonia generation by changing the heating parameters. Other gaseous species are present in very small quantities, and include $B_2H_6$, BNH and $(BHNH)_3$ (FIG. 7). A comprehensive account of the decomposition of pure $BH_3NH_3$ and the resulting evolved gaseous species is detailed in Baitalow, et al., "Thermal Decomposition of B—N—H Compounds Investigated By Using Combined Thermoanalytical Methods" *Thermochimica Acta*, 391 (2002), pp. 159-168, which is incorporated by reference in its entirety.

Figure 8:
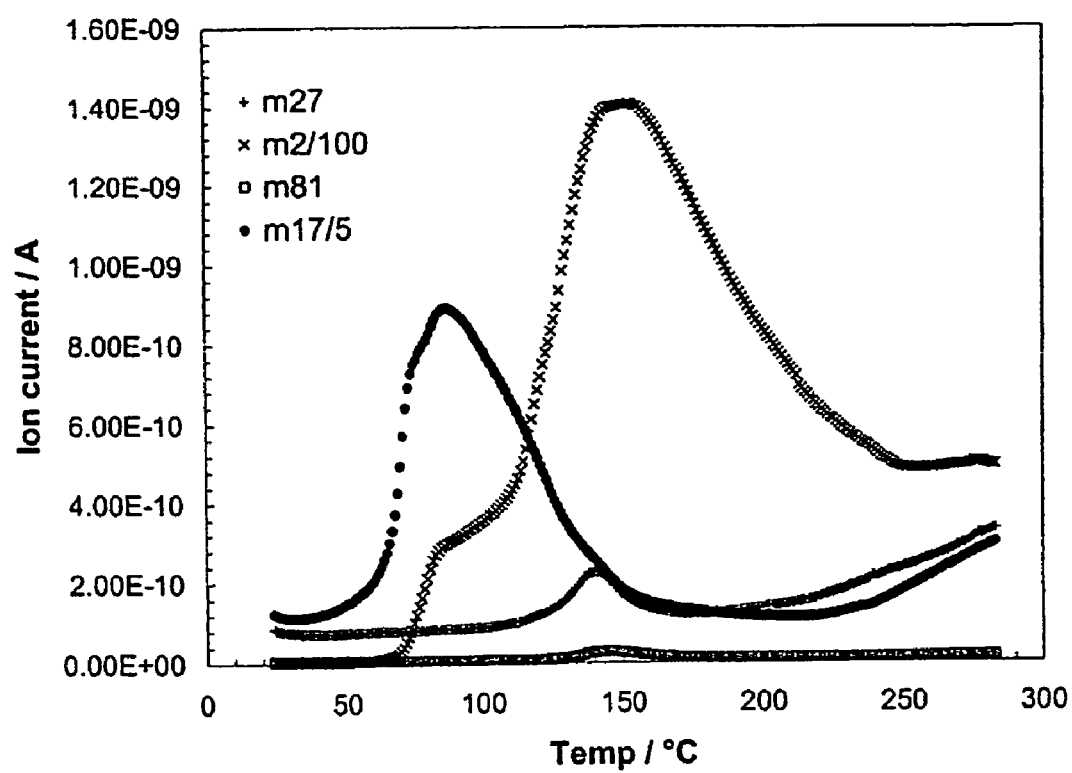
FIG. 8 shows the relationship between evolved gas and temperature for $nLiH—BH_3NH_3$ where n=1. Temperature dependence of the ion intensity is assigned to hydrogen (x), ammonia (●), diborane (□) and borazine (+) (heating rate 5° C./min) for $LiH—BH_3NH_3$.
Figure 9:
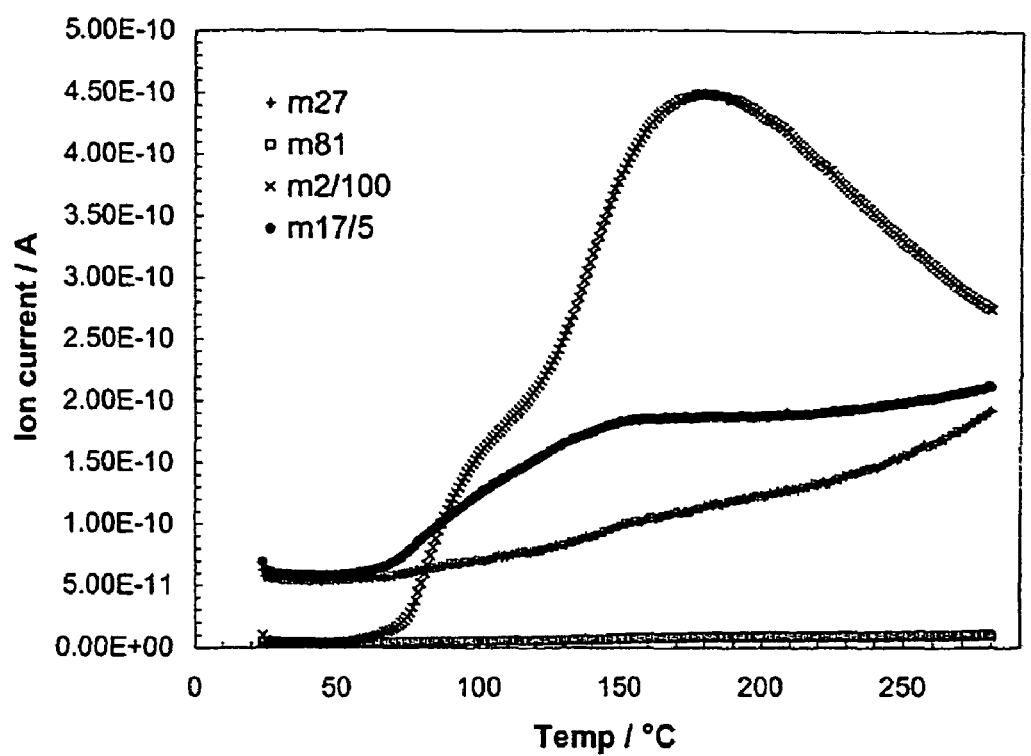
FIG. 9 shows the relationship between evolved gas and temperature for $nLiH—BH_3NH_3$ where n=2. Temperature dependence of the ion intensity is assigned to hydrogen (x), ammonia (●), diborane (□) and borazine (+) (heating rate 5° C./min) for 2LiH—BH$_3$NH$_3$.

A two-step decomposition is seen for n=1, and there is a small amount of hydrogen coming off in the first step, at about 60-70° C. (FIG. 8). There is also a substantial amount of ammonia being released at this temperature. The main amount of hydrogen is released in the second step, with a maximum at about 150° C. Very small amounts of diborane, and other BNH decomposition products are released mostly in the second step. The n=2 sample has the same general behavior as the n=1 composition, but with a smaller overall weight loss. The difference in the two steps of the gas release is more difficult to see for this composition, with the early hydrogen release being overshadowed by the strong broad maximum in the ion current for hydrogen at about 150° C. (FIG. 9). Increasing the amount of LiH further only causes a smaller overall weight loss, and does not influence the relative amounts of each evolved gas species. The same is true for n=⅓, which shows the same thermal and mass spectrometry data as the n=½ sample.

These new phases are surprising since the expectation was to substitute Li for H on the borazane molecule. However, here new crystallographic phases have been discovered. In fact, one of the phases discovered in this study (the α phase) is a borazane dimer, where two borazane molecules are linked together through a lithium bridge. There are a total of three new phases found in this system. All of them store large amounts of hydrogen. The phases found in this study show excellent hydrogen storage capabilities. A maximum of 10% weight loss below about 150° C. can be obtained for the n=½ composition. This is a substantially larger hydrogen storage capacity compared with other classes of materials.

TABLE 1

XRD d-spacings data for the α-phase. Peaks positions were obtained from the ½LiH—$BH_3NH_3$ sample.

| (hkl) | $d_o$ | $d_c$ | Relative Intensity |
|---|---|---|---|
| (002) | 8.5319 | 8.5005 | 589 |
| (004) | 4.2582 | 4.2503 | 88 |
| (101) | 3.9276 | 3.9234 | 4426 |
| (102) | 3.6445 | 3.6431 | 129 |
| (103) | 3.2806 | 3.2854 | 102 |
| (104) | 2.9273 | 2.9252 | 59 |
| (110) | 2.8527 | 2.8512 | 790 |
| (112) | 2.7043 | 2.7032 | 183 |
| (114) | 2.3685 | 2.3678 | 122 |
| (008) | 2.1249 | 2.1251 | 32 |
| (107) | 2.0797 | 2.0805 | 37 |
| (200) | 2.0157 | 2.0161 | 81 |
| (201) | 2.0026 | 2.0021 | 41 |

TABLE 1-continued

XRD d-spacings data for the α-phase. Peaks positions
were obtained from the ½LiH—BH$_3$NH$_3$ sample.

| (hkl) | d$_o$ | d$_c$ | Relative Intensity |
|---|---|---|---|
| (210) | 1.8034 | 1.8033 | 34 |
| (211) | 1.7931 | 1.7932 | 77 |
| (213) | 1.7188 | 1.7184 | 22 |
| (109) | 1.7100 | 1.7106 | 30 |
| (118) | 1.7025 | 1.7039 | 15 |
| (1011) | 1.4436 | 1.4432 | 28 |
| (220) | 1.4266 | 1.4256 | 29 |
| (0012) | 1.4159 | 1.4168 | 41 |
| (1112) | 1.2696 | 1.2688 | 40 |
| (1013) | 1.2430 | 1.2440 | 65 |

The n=½ composition has the best hydrogen storage capacity of the samples tested. The samples were not single phase. High temperature XRD combined with TGA, DSC and MS data indicate that the α phase releases hydrogen at about 150° C., while the β and γ phases has a lower decomposition temperature of about 80°. The decomposition behavior of the n=1 sample, containing both α and β, therefore reflects the behavior of both these phases. In fact, the rapid first decomposition step can be attributed to decomposition of the β phase, while the slower second step can be attributed to the α phase. Since the n=1 sample contains mostly α and β, with some small addition of LiH (about 10-20%), and based on the fact that the weight loss from the α phase is 40% of the full weight loss seen for the n=½ sample, there is about 40% α in the n=1 sample. Thus, there is also about 40% β in this sample. Based on this, the hydrogen storage capacity of the β phase is estimated at 6-7%. This is a substantial weight loss, and indicates that the β phase is attractive for hydrogen storage purposes. When viewing the DSC data, it seems that the exothermic signal for β decomposition is quite weak, signaling decomposition energetics favorable for recycling purposes. The MS data does suggest that some NH$_3$ is evolved in addition to the hydrogen. Based on this, a decomposition reaction is thought to be:

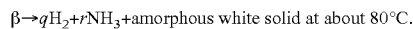

β→$q$H$_2$+$r$NH$_3$+amorphous white solid at about 80°C.

The α phase decomposes in much the same way as the β phase, releasing hydrogen and also small amounts of NH$_3$, diborane and borazine. Based on this, a decomposition reaction is thought to be:

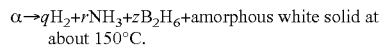

α→$q$H$_2$+$r$NH$_3$+$z$B$_2$H$_6$+amorphous white solid at about 150°C.

The high temperature XRD and TGA data suggest that γ decomposes at the same temperature as the β phase. Since the γ phase is seen together with the β phase in most samples, it is not possible to distinguish which of the decomposition products can be assigned to γ alone. Therefore, the same decomposition reaction is proposed for γ as for β:

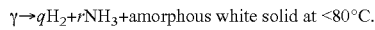

γ→$q$H$_2$+$r$NH$_3$+amorphous white solid at <80°C.

The apparent rate of decomposition for the β and γ phases, combined with the low decomposition temperature makes β and γ attractive for hydrogen storage. The hydrogen release is an exothermic process so that rehydrogenation is an economic challenge.

The results of the decomposition of α, β and γ have some major differences compared with the hydrogen storage properties of borazane itself. Pure borazane has been show to have a 14 wt % mass loss, but with additional decomposition products being NH$_3$, B$_2$H$_6$, (BHNH)$_3$ and others. The hydrogen is released in a two-step process, where borazane decomposed first to BH$_2$NH$_2$, and subsequently to polymeric BHNH. In contrast, the phases in the present invention decompose through single-step processes.

In summary, the nLiH—BH$_3$NH$_3$ system where n ranges from ⅓ to 6 has been demonstrated here and studied using X-ray diffraction (XRD), thermogravimetric analysis (TGA), differential scanning calorimetry (DSC), mass spectrometry (MS) and a combined DSC/TGA/MS technique. This system contains several different phases, some of which release hydrogen below 150° C., with advantages as described above.

Accordingly, based on the above example, it is apparent that there are three new, previously unknown, phases, designated α, β and γ, in the nLiH—BH$_3$NH$_3$ system. The α phase can store up to 10 wt % hydrogen, and release this hydrogen below 150° C. The hydrogen release is an exothermic event. From the XRD data, the α phase has been identified as a primitive tetragonal crystal structure with a P-42$_1$c space group and lattice parameters of a=4.032 angstroms and c=17.001 angstroms. A space group of a crystal is the mathematical description of the symmetry inherent in the structure. The space group is usually a combination of a unit cell with some form of motif centering, along with point operations of reflection, rotation and improper-rotation. In addition, there are translational symmetry elements. The basic translation is covered by the lattice-type, leaving combinations of reflections and rotations with translation including screw axis and glide plane (noted by a, b, or c). The hydrogen release for the β phase is very fast. The β phase releases hydrogen at about 80° C. Due to impurities in the samples containing the β phase, an experimentally-based estimate of the hydrogen storage capacity for the β phase was determined. It is estimated to be between 6 and 12 wt % based on the amount of impurities present. The B—H—Li—N quaternary system contains many new useable hydrogen storage phases.

Thus, in certain embodiments of the present invention, a hydrogen storage composition comprises X—H, Y—H and A-H bonds, where X comprises a Group 13 element, Y comprises a Group 15 element and A comprises one or more elements selected from the group consisting of Group 1, Group 2 and mixtures thereof. In certain preferred embodiments, X includes boron and Y includes nitrogen. Thus, a hydrogen storage composition can be formed from precursor (a) comprising X—H and Y—H bonds and precursor (b) comprising said A-H bonds, where (a) and (b) are in atomic proportion to one another sufficient to provide a composition expressed by the nominal general formula A$_q$X$_r$Y$_s$H$_t$ where the atomic ratio of q:r is greater than 0 and less than about 3, the atomic ratio of s:r is greater than 0 and less than about 2 and the atomic ratio of t:r is greater than 0 and less than about 9.

In certain embodiments, where A comprises Li, X comprises B, Y comprises N, the atomic ratio of Li:B is greater than 0 and less than about 3, the atomic ratio of N:B is greater than 0 and less than about 2, and the atomic ratio of H:B is greater than 0 and less than about 9. In certain embodiments, the proportion of elements is sufficient to provide a composition expressed by the nominal general formula Li$_2$BNH$_8$.

In one embodiment, a hydrogen storage composition is represented by the nominal general formula A$_q$X$_r$Y$_s$H$_t$: where X comprises a Group 13 element, Y comprises a Group 15 element and A comprises one or more elements selected from the group consisting of Group 1, Group 2 and mixtures thereof. The atomic ratio of q:r is greater than 0 and less than about 3, the atomic ratio of s:r is greater than 0 and less than about 2 and the atomic ratio of t:r is greater than 0 and less than about 9.

In another embodiment, a hydrogen storage composition is represented by the nominal general formula $A_qX_rY_sH_t$: where X comprises boron (B), Y comprises nitrogen (N), and A comprises one or more elements selected from the group consisting of Group 1, Group 2 and mixtures thereof. At least one of the elements forming A is lithium (Li). The atomic ratio of q:r is greater than 0 and less than 3, the atomic ratio of s:r is greater than 0 and less than about 2 and the atomic ratio of t:r is greater than 0 and less than about 9. The composition comprises at least one phase that is an α phase having two borazane molecules linked together through a lithium bridge. In certain embodiments, the α phase has the equivalent of more than two $BH_3NH_3$ molecules per unit cell. The α phase is substantially a tetragonal crystal structure, with a $P-42_1c$ space group. Preferably, the hydrogen storage composition also comprises a β phase distinct from the α phase. Further, the hydrogen storage composition can also contain a γ phase distinct from both the α phase and the β phase. The α phase is a substantially tetragonal crystal structure with lattice parameter a of about 4 angstroms, more specifically 4.032 angstroms, and lattice parameter c of about 17 angstroms, more specifically 17.001 angstroms.

EXAMPLE 2

This example is for new hydrogen storage materials, as well as the preparation method. The materials are mixtures of borazane ($BH_3NH_3$) and lithium alanate ($LiAlH_4$).

Cold milling borazane and $LiAlH_4$ produces hydrogen storage materials with thermal properties that differ from those of starting materials. $LiAlH_4$ additions to borazane reduce the exothermicity of desorption and the amount of byproducts. An optimum concentration of 20 mol % $LiAlH_4$ was observed. An exemplary preparation method follows.

The mixing (ball-milling) was done under quasi-cryogenic conditions at preferred temperature of liquid nitrogen, about −195° C. Temperatures below room temperature are usable, with temperatures between about 25° C. and −195° C. The combination of mixing borazane with lithium alanate and milling it below room temperature resulted in a hydrogen storage material that had less byproducts than pure borazane and one that desorbed hydrogen with less exothermicity than pure borazane. The calorimetry is important because endothermic desorptions and very weakly exothermic desorptions are thought to be reversible.

The raw materials were first milled separately in an inert atmosphere (argon) at room temperature for 30 minutes to reduce the particle size. Next, 0.5 g of the milled borazane and the appropriate amount of milled lithium alanate were milled together, again in an inert atmosphere. Each vessel was retrofitted with a steel cap to promote a good seal with the vessel at cryogenic conditions.

Cold milling was accomplished by first dipping the vessel in a bath of liquid nitrogen for approximately two hours to cool, before ball-milling started. Mixing was allowed to occur for no more than five minutes due to sample heating once out of the liquid nitrogen bath. If more milling time was desired, the vessel was first placed in liquid nitrogen for fifteen minutes to cool. After all of the milling was completed, the vessel was again inserted into the liquid nitrogen bath for approximately one hour before it was allowed to warm up to room temperature overnight.

Results of Example 2

Figure 10:
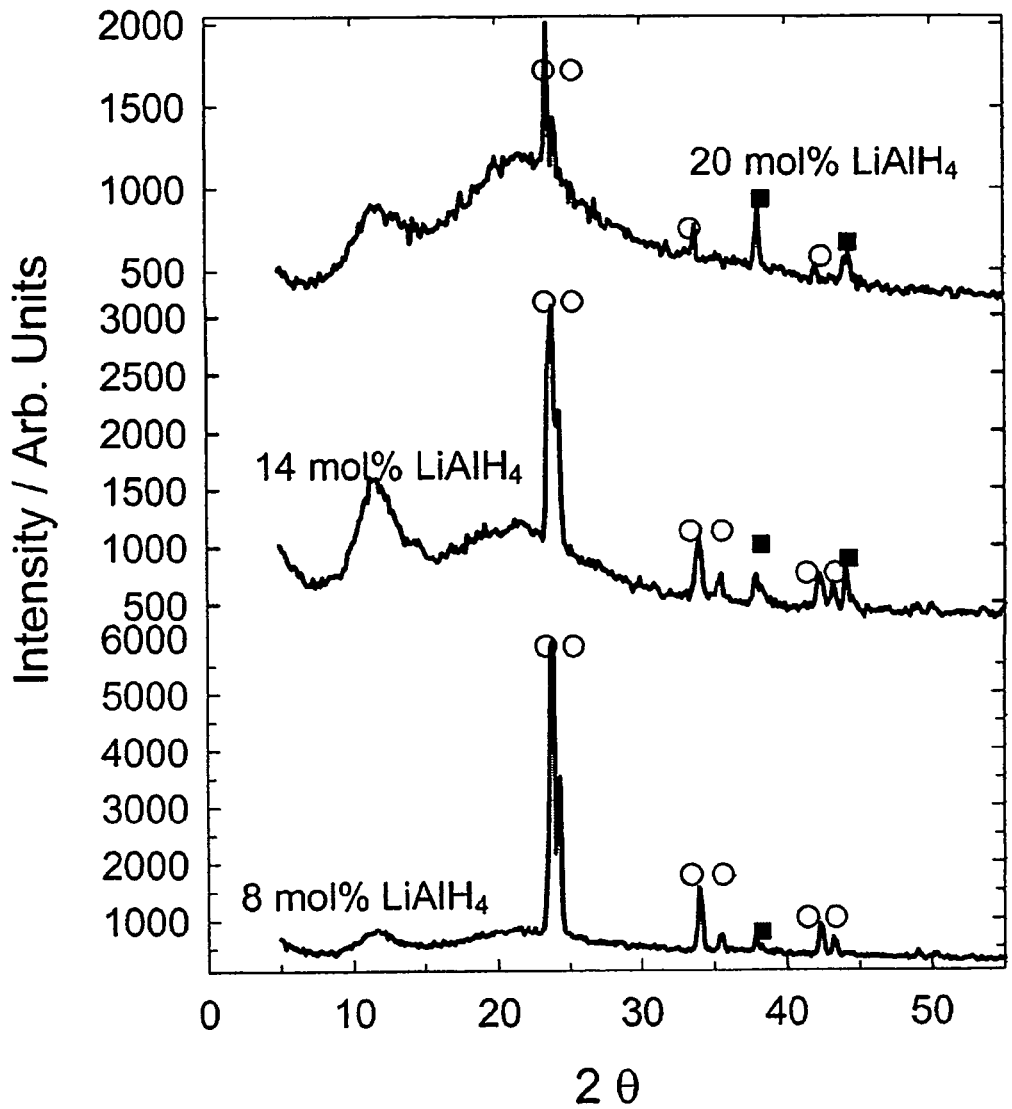
FIG. 10 shows XRD patterns for three LiAlH$_4$—BH$_3$NH$_3$ compositions. The open circles identify the BH$_3$NH$_3$ diffraction peaks, while the solid squares are from aluminum.

FIG. 10 shows the X-ray patterns for the $xLiAlH_4(100-x)$ $BH_3NH_3$ starting compositions (x=8, 14 and 20). All samples have been ball-milled under cryogenic conditions for 5 min. For the x=8 composition, the main diffraction peaks can be ascribed to $BH_3NH_3$ (open circles) with only very small amounts of Al-metal (solid squares) as a ball-milling product. There is no evidence for any $LiAlH_4$ starting material still being present in the sample. It is therefore assumed that all lithium alanate is consumed during ball-milling, and the Al-metal is formed as a result of this reaction. Increasing the lithium alanate content in the sample increases the intensity of the aluminum peaks, and decreases the intensity of the borazane peaks. Further increase of $LiAlH_4$ results in a rapid decrease in the borazane peak intensity without a correspondingly strong increase in the aluminum peak intensity (x=20 composition). There is one very broad feature at about 10-15° which is strongest for the x=14 composition. This feature is not consistent with either of the starting materials, and also not consistent with aluminum metal. From the X-ray diffraction data, it seems that there is a chemical reaction between the starting components during the cryogenic ball-milling, and the product of this reaction does not have any crystalline X-ray diffraction pattern. The amorphous nature of this reaction product is probably partly due to the cryogenic conditions under which it was formed, the low temperature slowing down diffusion in the sample. However, the same starting composition and ball-milling times at room temperature does not produce any crystalline products either. Rather ball-milling these materials together at room temperature results in decomposition of the material inside the ball-milling vessel. The only crystalline product found in the diffraction pattern is aluminum metal, and there is a substantial overpressure inside the vessel, stemming from gaseous decomposition products. It is quite curious that there are no crystalline lithium phases to be found, and the nature of the lithium in the reaction products is not known.

Figure 11:
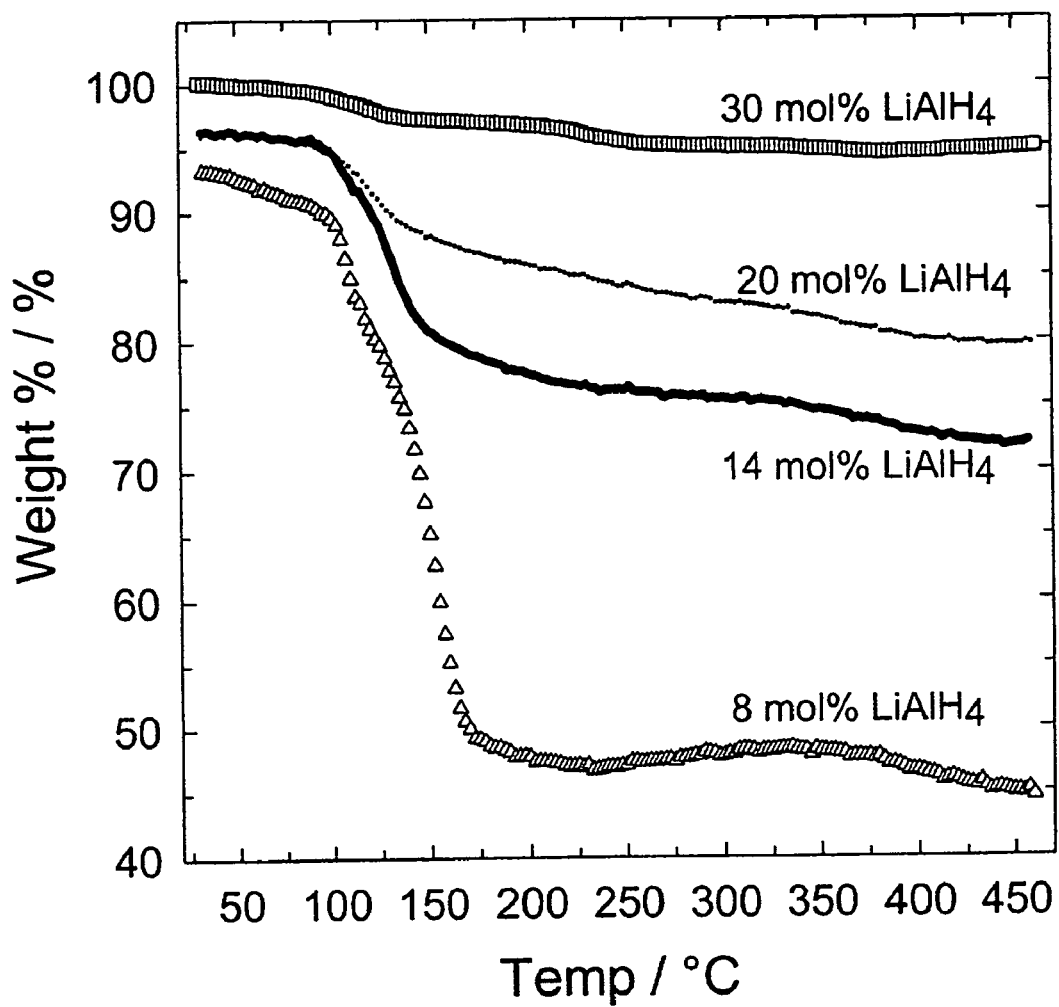
FIG. 11 shows TGA curves for 8 mol % LiAlH$_4$ (triangles), 14 mol % LiAlH$_4$ (line), 20 mol % LiAlH$_4$ (dots) and 30 mol % LiAlH$_4$ (squares).

FIG. 11 shows TGA curves for different $xLiAlH_4(100-x)$ $BH_3NH_3$ compositions (x=8, 14, 20, and 30). All samples have been ball-milled under cryogenic conditions for 5 min. The x=8 composition has a two-step weight loss, where the two steps are largely overlapping. The first weight loss starts at about 100° C., followed by a new, larger, weight loss at about 120° C. This two-step reaction is quite similar to that seen by pure borazane. The first decomposition step for $BH_3NH_3$ is at about 100° C., and the second at about 130° C. It is not surprising, given the large excess of $BH_3NH_3$ in the x=8 sample, that borazane decomposition dominates the overall weight loss picture. For the other compositions, only a single weight loss is observed, with an onset of about 100° C. for all compositions. This means that these more alanate-rich compositions behave differently than borazane, indicating again that the ball-milling has produced new materials.

Figure 12:
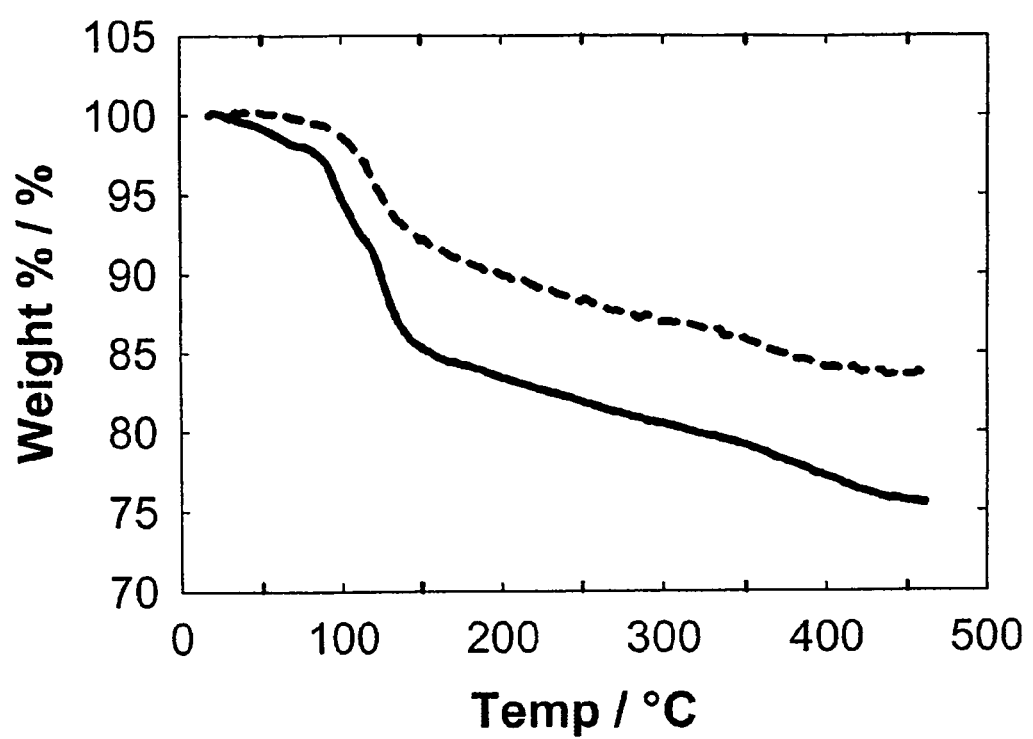
FIG. 12 shows TGA curves of the 20 mol % LiAlH$_4$-80 mol % BH$_3$NH$_3$ composition ball-milled for 5 minutes at room temperature (solid line) and at cryogenic conditions (dashed line).

A comparison between the weight loss after cryogenic and room temperature ball-milling is seen in FIG. 12, where the TGA curves for x=20 at room temperature (solid line) and cryogenic (dashed line) conditions is shown. As seen, there are more gaseous byproducts being formed during the decomposition of the room temperature sample compared with the cryogenically ball-milled sample. Both samples have been ball-milled for 5 min. The trend is apparent for other compositions and ball-milling times as well, and it is clear that less byproducts form if the sample has been ball-milled under cryogenic conditions.

Figure 13:
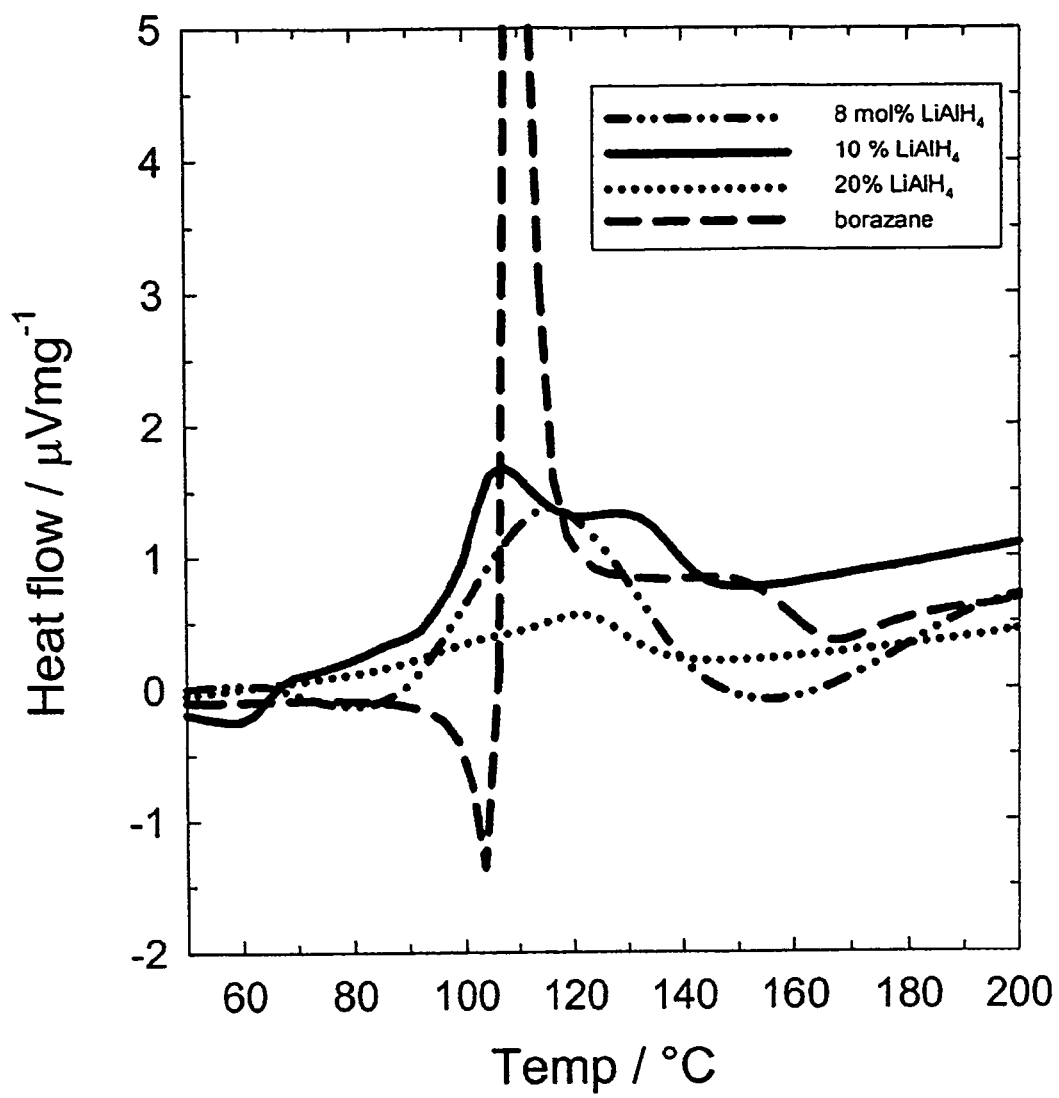
FIG. 13 shows DSC curves for neat borazane (dashed), 8 mol % LiAlH$_4$ (dash-dot-dot), 14 mol % LiAlH$_4$ (solid) and 20 mol % LiAlH$_4$ (dotted).
Figure 14:
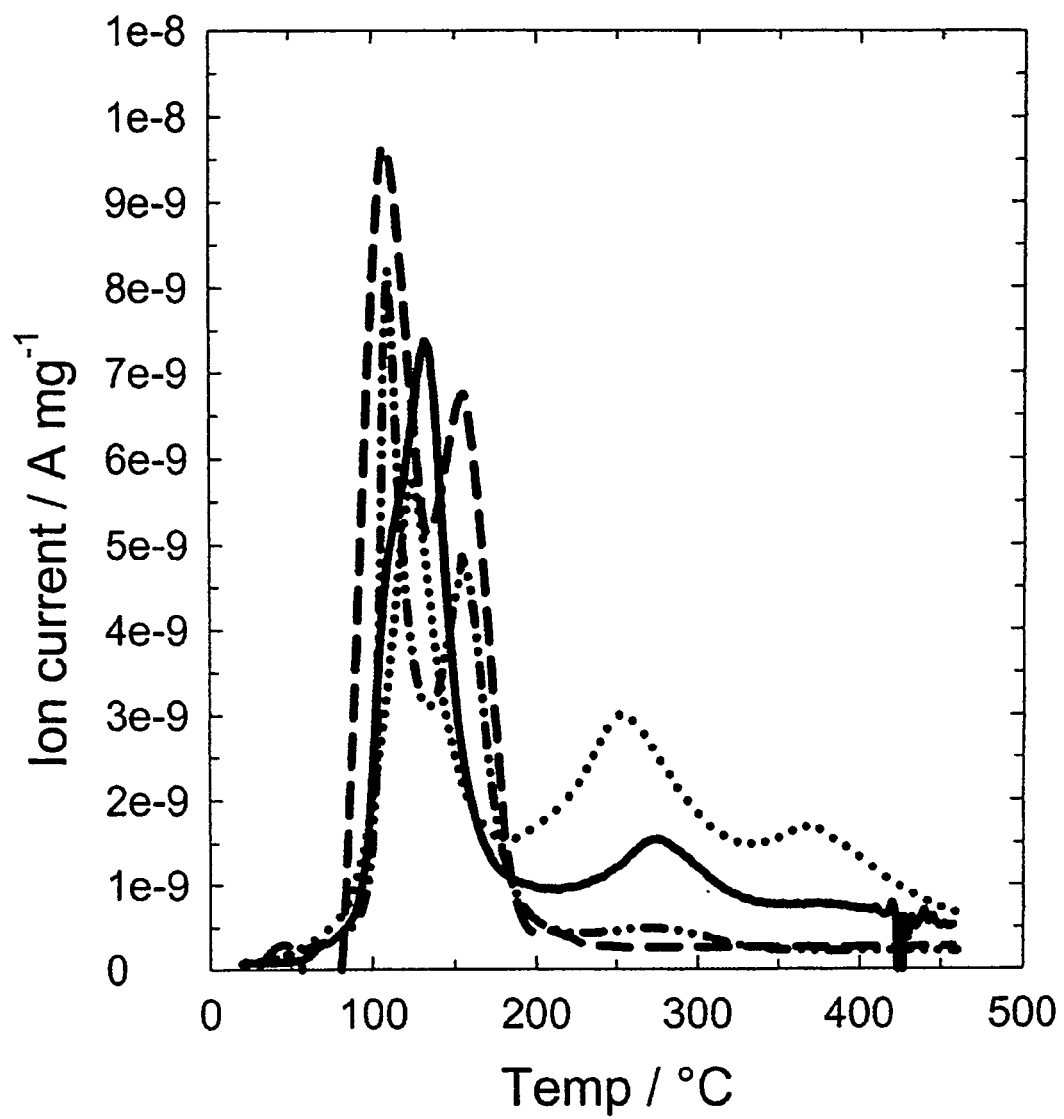
FIG. 14 shows the temperature dependence of the ion intensity assigned to hydrogen (H$_2$) (heating rate 5° C./min) for neat borazane (dashed), 8 mol % LiAlH$_4$ (dash-dot-dot), 14 mol % LiAlH$_4$ (solid) and 20 mol % LiAlH$_4$ (dotted).
Figure 15:
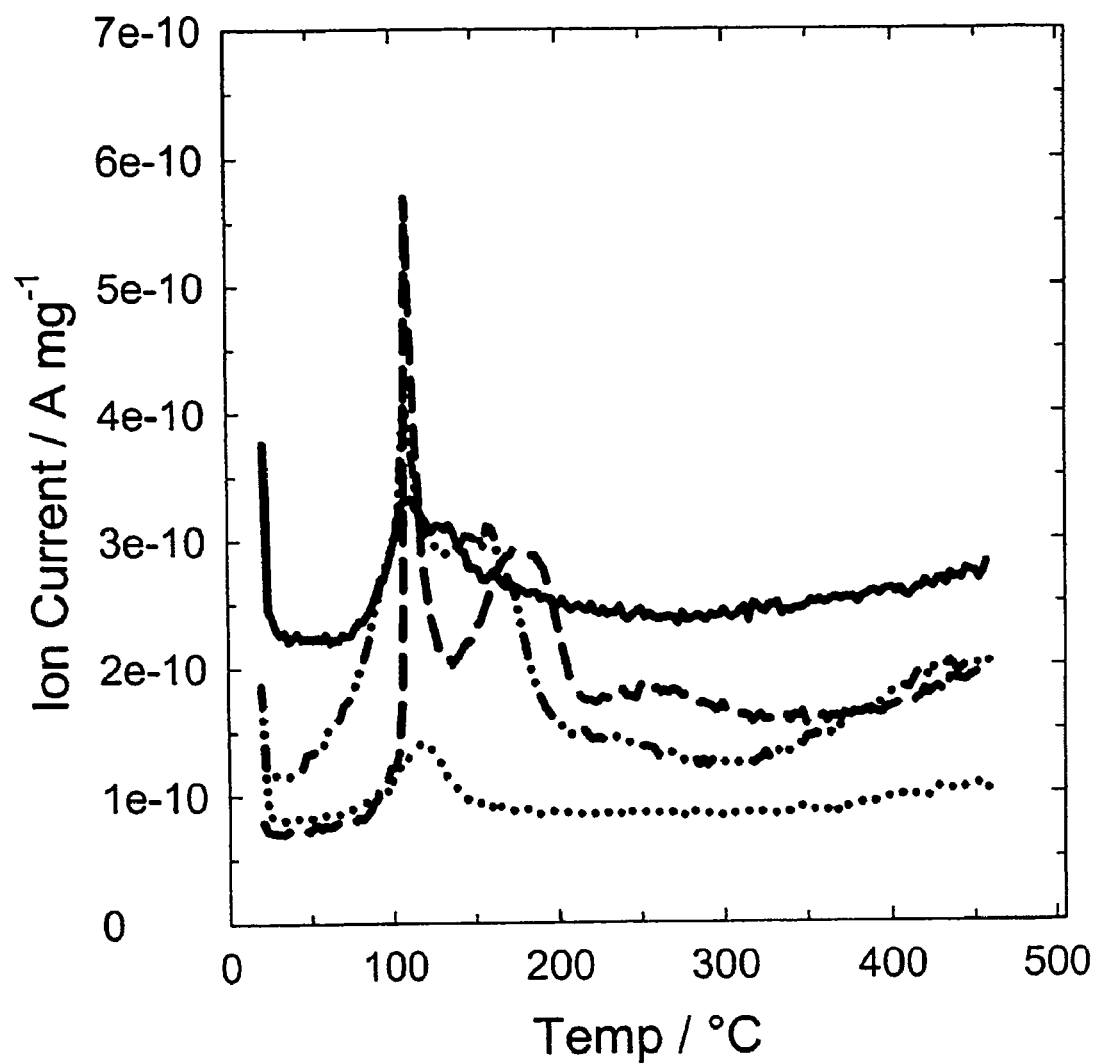
FIG. 15 shows the temperature dependence of the ion intensity assigned to ammonia (NH$_3$) (heating rate 5° C./min) for neat borazane (dashed), 8 mol % LiAlH$_4$ (dash-dot-dot), 14 mol % LiAlH$_4$ (solid) and 20 mol % LiAlH$_4$ (dotted).
Figure 16:
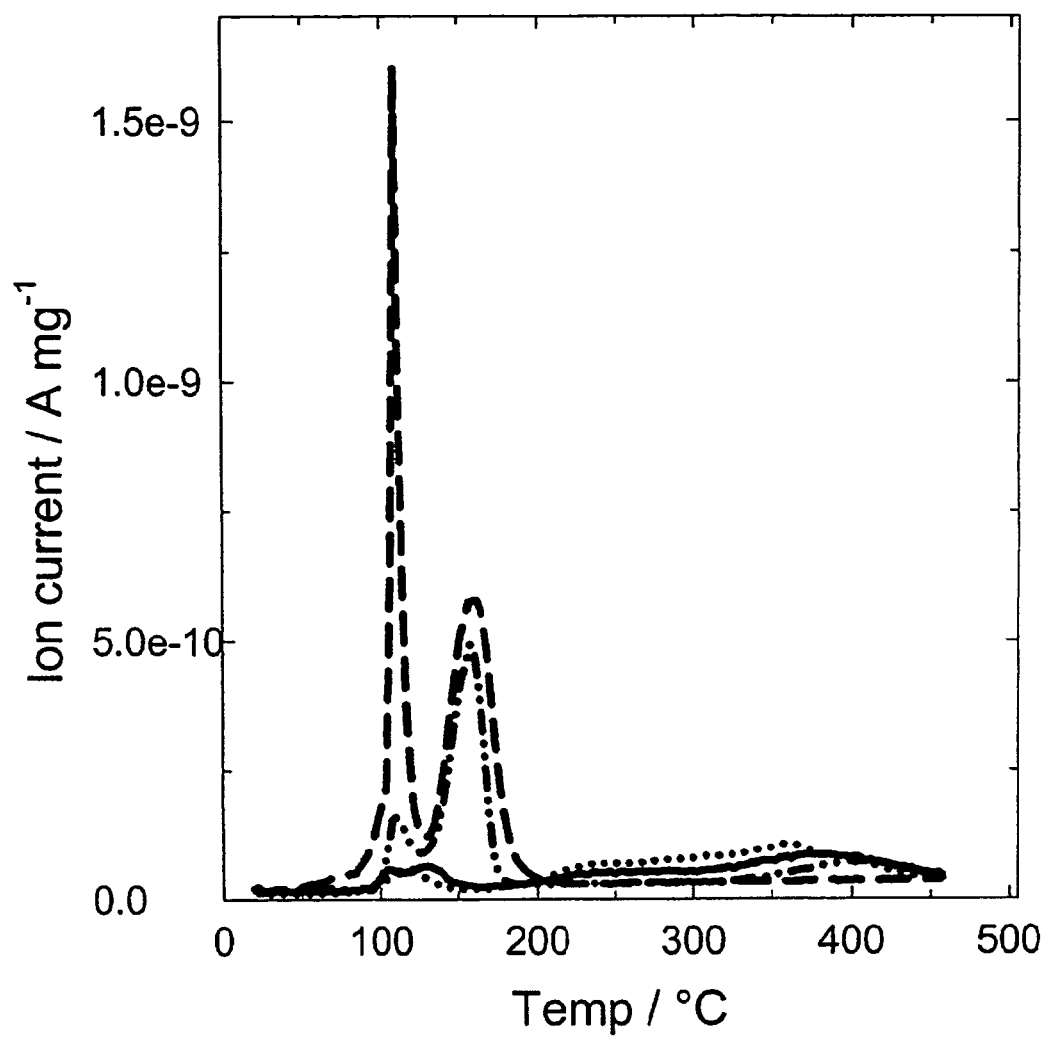
FIG. 16 shows the temperature dependence of the ion intensity assigned to a borazane byproduct (BNH$_x$) (heating rate 5° C./min) for neat borazane (dashed), 8 mol % LiAlH$_4$ (dash-dot-dot), 14 mol % LiAlH$_4$ (solid) and 20 mol % LiAlH$_4$ (dotted).
Figure 17:
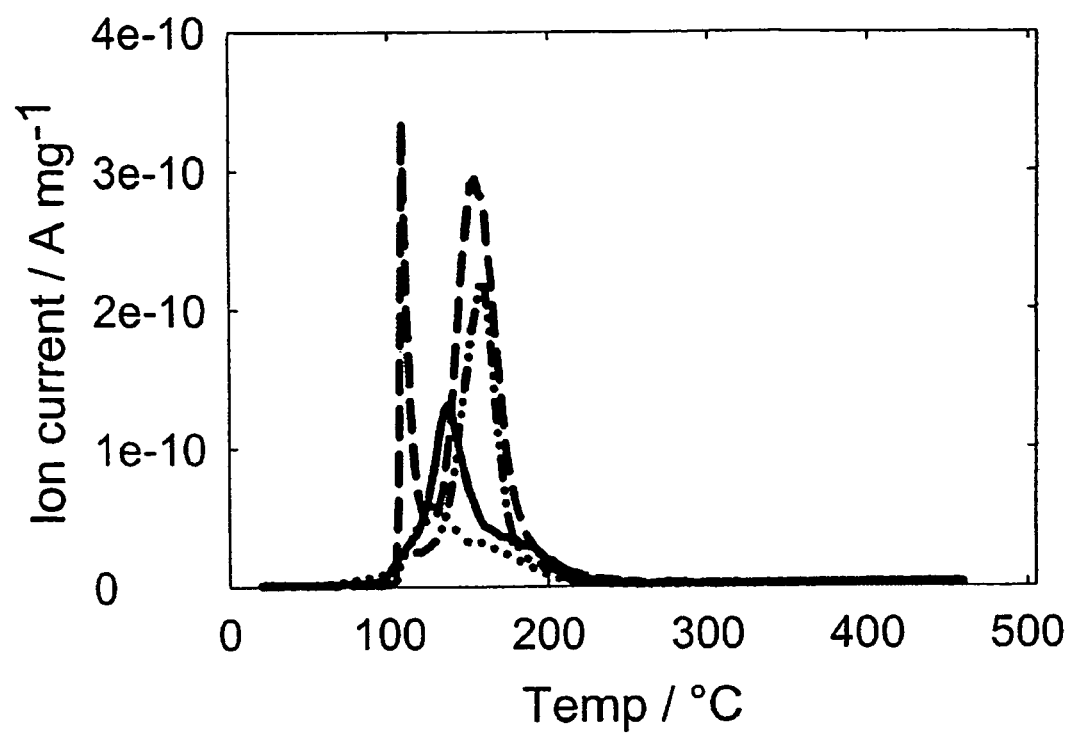
FIG. 17 shows the temperature dependence of the ion intensity assigned to borazine ([BHNH]$_3$) (heating rate 5° C./min) for neat borazane (dashed), 8 mol % LiAlH$_4$ (dash-dot-dot), 14 mol % LiAlH$_4$ (solid) and 20 mol % LiAlH$_4$ (dotted).

FIG. 13 shows the DSC signals in the range 50-200° C. where most of the thermal events occur. It is seen that the DSC signal is affected to a large extent by the $LiAlH_4$ concentration. When heated, borazane alone usually shows a small endothermic melting followed by a strong exothermic event that occurs at about 100° C. (the same temperature as a majority of the mass loss). The addition of LiAlH$_4$ reduces the exothermic behavior of the material significantly. The small endothermic melting feature also disappears with increasing LiAlH$_4$ content, and in fact, by adding 20 mol % LiAlH$_4$ the resulting sample is almost thermo-neutral. However, by adding even more LiAlH$_4$, 45 mol %, the material that is produced after milling does not have any measurable weight loss nor does it have a thermal event in the temperature range associated with typical industrial and/or practical applications, such as automotive applications.

The amounts of hydrogen and byproducts (i.e. NH$_3$ and (BHNH)$_3$) that desorb from each of the samples are shown in FIGS. 14-17. Since the mass spectrometer was not calibrated, the results are not presented in concentrations but rather as ion currents in units of current per mass of sample. It is seen from FIG. 14 that hydrogen is the major component of the gas phase during decomposition, and that its detection corresponds very well to the weight loss registered by the TGA. However, both NH$_3$ and (BHNH)$_3$ are also seen at the start of the weight loss, thus making it difficult to construct a temperature scheme that will completely eliminate the contamination. What is seen, however, is that the amount of LiAlH$_4$ present in the sample greatly reduces the amount of contaminants. Table 2 shows the area under each of the mass spectrometer signals for each product normalized to the amount of borazane in the sample. This normalization was done to confirm that the alanate was not just a dilutant. The 20 mol % alanate system cold milled for 5 min reduces the amount of NH$_3$, BNH$_x$ and (BHNH)$_3$ that desorbs by more than any of the other samples. As compared to borazane alone, the NH$_3$ and BNH$_x$ concentrations are reduced by an order of magnitude, while the (BHNH)$_3$ concentration is reduced by nearly an order of magnitude. It appears from this set of experiments that there is an optimum concentration of 20 mol % LiAlH$_4$ and milling for more than 5 minutes is not beneficial because more byproducts desorb upon heating.

In summary, the cold milling, or cryogenic milling, process of the present invention is conducted at a temperature below ambient or below about room temperature or ambient conditions, nominally considered to be 25° C., desirably at a cold temperature less than −100° C., and preferably and conveniently at the temperature of liquid nitrogen of about −195° C. In this cold condition, metastable phases are achieved that would otherwise not form during room temperature ball-milling. Regular room temperature ball-milling essentially drives the system to a completely dehydrogenated state, and the resulting product is not capable of accepting any hydrogen. Cooling down the materials before ball-milling and subsequent cold milling conditions creates an environment where compounds that are unstable at room temperature can exist. The kinetics are slow enough, even at ambient conditions, that the decomposition of these products can be controlled by gentle heating. Accordingly, reaction is conveniently controllable so that ambient conditions provide sustained shelf life. Thus, the product has sustained shelf life at ambient conditions and further extended shelf life at cooler conditions.

The present invention overcomes difficulties encountered when precursor materials are mixed together at essentially ambient conditions and where such mixing generates heat due to the energy of impact, resulting in dehydrogenated hydrogen storage materials that substantially evolve byproducts with no hydrogen or very low portion of hydrogen released in the form of hydrogen gas. The pre-mature release of hydrogen, either in pure gaseous form or bound in undesirable byproducts is thus avoided, so that the hydrogen storage system has both controlled storage and release conditions, optimizing the release of hydrogen in pure gaseous form. This system is achieved by controlling temperature and pressure conditions, particularly by maintaining temperature below about 25° C. with pressure at ambient conditions.

Therefore, the present invention achieves mixing at a temperature that does not initiate a hydrogen release reaction and that facilitates release of hydrogen under conditions where a higher proportion of substantially pure hydrogen gas is released out of the materials, and a lesser proportion of hydrogen is bound in undesirable decomposition products. The process also improves thermal behavior of the materials lending itself to a thermodynamic system for regeneration or rehydrogenation. Therefore, the system and method provides hydrogen release with a thermic control, as compared to conventional systems and methods.

Conveniently, when it is desired to release hydrogen from the system, the system may be permitted to simply heat to room temperature; however, the release of hydrogen is very slow and even at room temperature, the hydrogen storage material has an essentially stable shelf life, at least for a period of months, due to the very slow decay time. Conveniently, when it is desired to evolve hydrogen at a high-volume rate, the system is heated to about 100° C. to evolve hydrogen. Such evolution occurs with a lower proportion of undesirable byproduct compounds, as described earlier.

Advantageously, according to the above, the invention provides a new material that is essentially stable at room temperature in a suitable atmosphere or environment and at least meta-stable at room temperature. Such suitable atmosphere or environment constitutes one which does not react with the material, is essentially inert with respect to the material and is desirably non-oxidizing, and preferably a vacuum or inert atmosphere. Representative inert gases are argon and helium and the like. The material formed by the process of the invention is kinetically inhibited from decomposition until heat is added, preferably to 100° C.

The preferred combination of precursors is about 20 atomic percent lithium alanate (LiAlH$_4$) and about 80 atomic % of the borazane. The cold ball-milling process is conveniently conducted for about five minutes, and the weight percent evolution is about 16%, which is very attractive relative to the theoretical maximum of hydrogen evolution on the order of 17-18%.

TABLE 2

Effect of LiAlH$_4$ Concentration on Desorption Product Quantities

| LiAlH$_4$ Conc. [mol %] | Length of Cold Milling Time [min] | H$_2$ [A s mg$^{-1}$] | NH$_3$ [A s mg$^{-1}$] | BHNH [A s mg$^{-1}$] | B$_3$N$_3$H$_6$ [A s mg$^{-1}$] |
|---|---|---|---|---|---|
| 8 | 5 | $1.28 \times 10^{-7}$ | $3.35 \times 10^{-8}$ | $2.12 \times 10^{-8}$ | $9.3 \times 10^{-9}$ |
| 14 | 5 | $3.74 \times 10^{-7}$ | $5.26 \times 10^{-9}$ | $1.98 \times 10^{-9}$ | $6.42 \times 10^{-9}$ |

TABLE 2-continued

Effect of LiAlH$_4$ Concentration on Desorption Product Quantities

| LiAlH$_4$ Conc. [mol %] | Length of Cold Milling Time [min] | H$_2$ [A s mg$^{-1}$] | NH$_3$ [A s mg$^{-1}$] | BHNH [A s mg$^{-1}$] | B$_3$N$_3$H$_6$ [A s mg$^{-1}$] |
|---|---|---|---|---|---|
| 20 | 5  | $1.6 \times 10^{-7}$  | $2.24 \times 10^{-9}$ | $1.28 \times 10^{-9}$  | $2.77 \times 10^{-9}$ |
| 14 | 10 | $4.36 \times 10^{-7}$ | $1.54 \times 10^{-8}$ | $9.42 \times 10^{-10}$ | $9.78 \times 10^{-9}$ |
| 0  | —  | $6.75 \times 10^{-7}$ | $1.45 \times 10^{-8}$ | $3.48 \times 10^{-8}$  | $1.38 \times 10^{-8}$ |

The description of the invention is merely exemplary in nature and thus, variations that do not depart from the gist of the invention are intended to be within the scope of the invention. Such variations are not to be regarded as a departure from the spirit and scope of the invention.

What is claimed is:

1. A method of storing and, later, releasing hydrogen comprising:
    ball-milling precursor (a) and precursor (b) at a temperature below about 25° C. that is within a range sufficient to prevent pre-mature release of hydrogen and sufficient to induce reaction between precursors (a) and (b) to provide a ball-milled material comprising a hydrogen-containing product different from (a) and (b), where precursor (a) is borazane (BH$_3$NH$_3$) and precursor (b) is a hydride selected from the group consisting of LiH, LiAlH$_4$ and mixtures thereof and where, on the basis of 100 mole percent of precursor (a) plus precursor (b), the borazane is present in an amount of 50 mole percent or greater; and, thereafter, upon demand for hydrogen,
    heating the ball-milled material to a temperature of at least 100° C. to release hydrogen.

2. The method of claim 1, wherein the ball-milling of precursors (a) and (b) is at a temperature at a range of between about 25° C. and about −195° C.

3. The method of claim 1, wherein precursor (b) comprises lithium aluminum hydride and wherein on the basis of 100 mole percent, the borazane is present in an amount greater than 50% and the lithium aluminum hydride is present in an amount less than 50%.

4. The method of claim 1, wherein precursor (b) comprises lithium hydride and wherein on the basis of 100 mole percent, the borazane is present in an amount of 50% or greater.

5. The method of claim 1, where said ball-milling is high-energy ball-milling providing impact energy sufficient to induce said reaction.

6. The method of claim 1, wherein the ball-milling is conducted for a time sufficient to cause solid phase reaction among constituents in said precursors.

7. A method of storing and, later, releasing hydrogen comprising ball-milling precursor compounds borazane (BH$_3$NH$_3$) and lithium aluminum hydride (LiAlH$_4$) at a temperature below about 25° C. that is within a range sufficient to prevent premature release of hydrogen and sufficient to induce reaction between borazane and lithium aluminum hydride to form a ball-milled material comprising a hydrogen containing product different than BH$_3$NH$_3$ and LiAlH$_4$, where on the basis of 100 mole percent, the borazane is present in an amount of 80% and the lithium aluminum hydride is present in an amount of 20%; and thereafter, upon demand for hydrogen,
    heating the ball-milled material to a temperature of at least 100° C. to release hydrogen.

8. The method of claim 7, wherein the ball-milling of precursor compounds borazane and lithium aluminum hydride is at a temperature at a range of between about 25° C. and about −195° C.

9. The method of claim 7, wherein the ball-milling is conducted for a time sufficient to cause solid phase reaction among constituents in said precursors.

10. The method of claim 1 wherein the ball-milled material is stored in an essentially inert atmosphere to prevent degradation of the ball-milled material before hydrogen is demanded.

11. The method of claim 7 wherein the ball-milled material is stored in an essentially inert atmosphere to prevent degradation of the ball-milled material before hydrogen is demanded.

* * * * *